(12) United States Patent
Risbood et al.

(10) Patent No.: US 10,241,770 B2
(45) Date of Patent: Mar. 26, 2019

(54) CLOUD-BASED DEPLOYMENT USING OBJECT-ORIENTED CLASSES

(71) Applicant: GOOGLE LLC, Mountain View, CA (US)

(72) Inventors: Pankaj Risbood, Bangalore (IN); Parag Kacharulal Sarda, Bangalore (IN); Rahul S. Kulkarni, Maharashtra (IN); Rohit Jain, Rajasthan (IN); Vittaldas Sachin Shenoy, Calicut (IN); Vivek Sahasranaman, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/385,223

(22) Filed: Dec. 20, 2016

(65) Prior Publication Data

US 2017/0102931 A1    Apr. 13, 2017

Related U.S. Application Data

(63) Continuation of application No. 15/050,137, filed on Feb. 22, 2016, now Pat. No. 9,557,978, which is a
(Continued)

(51) Int. Cl.
*G06F 9/445* (2018.01)
*H04L 12/24* (2006.01)
(Continued)

(52) U.S. Cl.
CPC .............. *G06F 8/60* (2013.01); *G06F 9/4492* (2018.02); *G06F 9/44505* (2013.01);
(Continued)

(58) Field of Classification Search
CPC ...... G06F 8/61; G06F 9/4433; G06F 9/44505; G06F 9/5072; G06F 8/60; G06F 9/4492;
(Continued)

(56) References Cited

U.S. PATENT DOCUMENTS 5,463,768 A    10/1995 Cudihy et al.
5,778,444 A    7/1998 Langan et al.
(Continued)

OTHER PUBLICATIONS

Extended European Search Report issued in European Application No. 16195727.9-1959, dated Dec. 22, 2016, 6 pages.
(Continued)

*Primary Examiner* — Wei Y Zhen
*Assistant Examiner* — Mohammed N Huda
(74) *Attorney, Agent, or Firm* — Fish & Richardson P.C.

(57) ABSTRACT

Methods, systems, and apparatus, including computer programs encoded on a computer storage medium, for selection of ranked configurations. In one aspect, a method includes providing a plurality of class definitions for selection, each class definition modeling a respective data or functional component of a cloud-based environment using a group of configurable class parameters, each class definition supporting instantiation and inheritance of the class definition in a configuration specification for a cloud-based deployment; deriving respective performance metrics associated with each of the plurality of class definitions based on aggregated performance of multiple cloud-based deployments, wherein the multiple cloud-based deployments had been carried out according to respective configuration specifications that require instantiation of the class definition or a new class definition derived from the class definition; and utilizing the respective performance metrics associated with each of the plurality of class definitions in ranking the plurality of class definitions.

21 Claims, 16 Drawing Sheets

Related U.S. Application Data continuation of application No. 13/421,124, filed on Mar. 15, 2012, now abandoned.

(60) Provisional application No. 61/453,478, filed on Mar. 16, 2011.

(51) Int. Cl.
    *G06F 8/60*      (2018.01)
    *G06F 9/448*     (2018.01)
    *G06F 9/455*     (2018.01)
    *G06F 9/50*      (2006.01)

(52) U.S. Cl.
    CPC ........ *G06F 9/45558* (2013.01); *G06F 9/5072* (2013.01); *H04L 41/0266* (2013.01); *H04L 41/145* (2013.01); *H04L 41/5012* (2013.01); *G06F 2213/0038* (2013.01)

(58) Field of Classification Search
    CPC ......... G06F 9/45558; G06F 2213/0038; H04L 41/145; H04L 41/0266; H04L 41/5012
    USPC .................................................. 717/177, 174
    See application file for complete search history.

(56) References Cited

U.S. PATENT DOCUMENTS

| | | |
|---|---|---|
| 6,178,482 B1 | 1/2001 | Sollars |
| 6,505,211 B1 | 1/2003 | Dessloch et al. |
| 6,598,179 B1 | 7/2003 | Chirashnya et al. |
| 6,898,697 B1 | 5/2005 | Gao et al. |
| 7,062,718 B2 | 6/2006 | Kodosky et al. |
| 7,117,243 B2 | 10/2006 | Peart |
| 7,478,388 B1 | 1/2009 | Chen et al. |
| 7,596,620 B1 | 9/2009 | Colton et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,146,147 B2 | 3/2012 | Litvin et al. |
| 8,261,295 B1 | 9/2012 | Risbood et al. |
| 8,276,140 B1 | 9/2012 | Beda et al. |
| 8,478,880 B2 | 7/2013 | Finkelstein |
| 8,533,796 B1 | 9/2013 | Long et al. |
| 8,677,449 B1 | 3/2014 | Beda |
| 8,739,157 B2 | 5/2014 | Ho |
| 8,745,329 B2 | 6/2014 | Kadatch et al. |
| 8,800,009 B1 | 8/2014 | Beda et al. |
| 8,812,586 B1 | 8/2014 | Kulkarni et al. |
| 8,813,240 B1 | 8/2014 | Northup |
| 8,874,888 B1 | 10/2014 | Beda, III et al. |
| 8,909,939 B1 | 12/2014 | Beda et al. |
| 8,958,293 B1 | 2/2015 | Anderson |
| 8,983,860 B1 | 3/2015 | Beda et al. |
| 9,063,818 B1 | 6/2015 | Risbood et al. |
| 9,069,616 B2 | 6/2015 | Kadatch et al. |
| 9,135,037 B1 | 9/2015 | Petrescu-Prahova et al. |
| 9,176,759 B1 | 11/2015 | Sahasranaman et al. |
| 9,237,087 B1 | 1/2016 | Risbood et al. |
| 9,258,271 B1 | 2/2016 | Anderson |
| 9,419,921 B1 | 8/2016 | Anderson |
| 9,619,662 B1 | 4/2017 | Besa et al. |
| 9,672,052 B1 | 6/2017 | Berreth et al. |
| 2002/0065957 A1* | 5/2002 | Rubin ............... G06F 17/30607 719/330 |
| 2002/0091902 A1 | 7/2002 | Hirofuji |
| 2004/0139368 A1 | 7/2004 | Austen et al. |
| 2004/0193388 A1 | 9/2004 | Outhred et al. |
| 2005/0132007 A1 | 6/2005 | Scian et al. |
| 2005/0166011 A1 | 7/2005 | Burnett et al. |
| 2005/0216908 A1 | 9/2005 | Keohane et al. |
| 2006/0161753 A1 | 7/2006 | Aschoff et al. |
| 2007/0118694 A1 | 5/2007 | Watanabe et al. |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2007/0288921 A1 | 12/2007 | King et al. |
| 2008/0086515 A1 | 4/2008 | Bai et al. |
| 2008/0205415 A1 | 8/2008 | Morales |
| 2008/0215796 A1 | 9/2008 | Lam et al. |
| 2008/0244471 A1 | 10/2008 | Killian et al. |
| 2008/0270704 A1 | 10/2008 | He et al. |
| 2009/0097657 A1 | 4/2009 | Schiedt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0241108 A1 | 9/2009 | Edwards et al. |
| 2009/0249440 A1 | 10/2009 | Platt et al. |
| 2009/0276771 A1* | 11/2009 | Nickolov et al. ..... G06F 9/4856 717/177 |
| 2009/0300605 A1 | 12/2009 | Edwards et al. |
| 2010/0057913 A1 | 3/2010 | DeHaan |
| 2010/0071035 A1 | 3/2010 | Budko et al. |
| 2010/0199089 A1 | 8/2010 | Vysogorets et al. |
| 2010/0287548 A1 | 11/2010 | Zhou et al. |
| 2011/0022812 A1 | 1/2011 | van der Linden et al. |
| 2011/0055361 A1 | 3/2011 | DeHaan |
| 2011/0085563 A1 | 4/2011 | Kotha et al. |
| 2011/0103389 A1 | 5/2011 | Kidambi et al. |
| 2011/0153838 A1 | 6/2011 | Belkine et al. |
| 2011/0191485 A1 | 8/2011 | Umbehocker |
| 2011/0231280 A1 | 9/2011 | Farah |
| 2011/0258441 A1 | 10/2011 | Ashok et al. |
| 2011/0295998 A1 | 12/2011 | Ferris |
| 2012/0266159 A1 | 3/2012 | Risbood et al. |
| 2012/0096134 A1* | 4/2012 | Suit ...................... G06F 9/5072 709/221 |
| 2012/0137003 A1 | 5/2012 | Ferris et al. |
| 2012/0159517 A1 | 6/2012 | Shen et al. |
| 2012/0185688 A1 | 7/2012 | Thornton |
| 2012/0191912 A1 | 7/2012 | Kadatch et al. |
| 2012/0204187 A1 | 8/2012 | Breiter |
| 2012/0222041 A1 | 8/2012 | Sabin |
| 2012/0239739 A1 | 9/2012 | Manglik |
| 2015/0347542 A1 | 12/2015 | Sullivan |
| 2017/0153900 A1 | 6/2017 | Hawkett |

OTHER PUBLICATIONS

U.S. Appl. No. 13/398,715, filed Feb. 17, 2012, Frank Berreth et al.
U.S. Appl. No. 13/348,548, filed Jan. 11, 2012, Beda et al.
U.S. Appl. No. 13/186,293, filed Jul. 19, 2011, Anderson et al.
U.S. Appl. No. 13/349,063, filed Jan. 12, 2012, Anderson.
Moller, Jan, et al., "Internal Network Security", Feb. 1, 2000-May 18, 2001, Retrieved from the Internet: <URL: http://www.daimi.au.dk/~fwiffo/thesis/>, 183 pages.
Primet, Pascale, et al.., "HIPCAL: State of the Art of OS and Network virtualization solutions for Grids", Sep. 14, 2007, 38 pages.
Wikipedia, "IPSec", [online] [retrieved on Jan. 4, 2011]. Retrieved from the Internet: <URL: http://en.wikipedia.org/wiki/IPsec/>, 8 pages.
Abdull, AlastairIrvine, et al. "Generic Routing Encapsulation", [online] [retrieved on Jan. 4, 2011]. Retrieved from the Internet: <URL: http://creativecommons.org/license/by-sa/3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

(56) References Cited

OTHER PUBLICATIONS

Myerson, Judith "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online] [Retrieved on Jan. 20, 2011]. Retrieved from the Internet <URL: http://en.wikipedia.org/wiki/OAuth> , 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs Lookup [Retrieved on Jun. 8, 2011], Retrieved from the Internet: <URL: http://pubs.vmware.com/vmci-sdk/functions/VMCIDs_Lookup.html>, 2 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.

Cala et al., "Automatic Software Deployment in the Azure Cloud", IFIP International Federation for Information Processing, 2010, pp. 1-14.

RSA Laboratories, "PKCS #11 v2.20: Cryptographic Token Interface Standard," Jun. 28, 2004, RSA Security Inc. (407 pages).

Amazon Auto Scaling—Getting Started Guide—API Version Aug. 1, 2010. Amazon Web Services LLC, 2010, 20 pages.

Amazon Auto Scaling—Developer Guide—API Version Aug. 1, 2010. Amazon Web Services LLC, 2011, 62 pages.

Amazon CloudWatch—Developer Guide—API Version Aug. 1, 2010. Amazon Web Services LLC, 2010, 75 pages.

Benincosa. "Ganglia and Nagios, Part 2: Monitor enterprise clusters with Nagios-Install Nagios to effectively monitor a data center; make Ganglia and Nagios work together," 2009, 20 pages.

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.

'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.

'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.

Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.

Paravirtualization, Wikipedia Article, downloaded from http://en.wikipedia.org/wiki/Paravirtualization on Mar. 18, 2012.

Paravirtualized File Systems, Eric Van Hensbergen, downloaded from http://www.slideshare.net/ericvh/9p-on-kvm on Mar. 18, 2012.

"IPsec". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-8.

"Generic Routing Encapsulation". Creativecommons.org [online]. Creative Commons Attribution—Share Alike 3.0 Unported. [retrieved on Jan. 14, 2011]. Retrieved from the Internet:<URL: http://creativecommons.org/licenses/by-sa/3.0/ >, pp. 1-5.

Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.

How To: Getting Started With Amazon EC2, Paul Stamatiou, Apr. 5, 2008. Retrieved from the Internet: <URL:http//paulstamatiou.com/how-to-getting-started-with-amazon-ec2>, 25 pages.

Uploading Personal ssh Keys to Amazon EC2, Eric Hammond, Oct. 14, 2010. Retrieved from the Internet: <URL:http://alestic.com/2010/10/ec2-ssh-keys>, 3 pages.

Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.

Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.

Using and Managing AWA—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, Jan. 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

Chieu et al. Solution-based Deployment of Complex Application Services on a Cloud, IEEE, 2010, pp. 282-287.

* cited by examiner

```
utils = Include('../lib/utils.pi')                                    ⎫ ⎰ 300
                                                                      ⎭ ↙ class Params(std.Parameters):                          ⎫
  replica_count = 1                                    ⎬ ⎰ 302
  serving_domain = 'www.my-domain.com'                 ⎪ ↙
  ip_array = []                                        ⎭ class SimpleHostingPackage(std.DataPackage):           ⎫ ⎰ 304
  src = 'data'                                         ⎬ ↙
  dst = '/var/www/static'                              ⎭ class SimpleHostingVM(utils.ConfiguratorLAMP):         ⎫
  name = 'webhost'                                     ⎪
  def replicas(replica_count):                         ⎪ ⎰ 306
    return replica_count                               ⎬ ↙
  def staticIP(ip_array):                              ⎪
    return list(ip_array)                              ⎭ class SimpleHostingRole(std.Role):                     ⎫
  roleName = 'webhost'                                 ⎪
  moduleName = 'simplehosting'                         ⎪
  dataPackages = [SimpleHostingPackage]                ⎬ ⎰ 308
  vms = [SimpleHostingVM]                              ⎪ ↙
  def roleParams(serving_domain):                      ⎪
    return {'serving_domain': serving_domain,          ⎪
        'document_root': '/var/www/static'}            ⎭ class SimpleHostingFirewall(utils.PublicTCPFirewall):  ⎫ ⎰ 310
  target = SimpleHostingRole                           ⎬ ↙
  ports = ['80']                                       ⎭ class SimpleHostingDeployment(utils.BaseDeployment):   ⎫ ⎰ 312
  roles = [SimpleHostingRole]                          ⎬ ↙
  firewalls = [SimpleHostingFirewall]                  ⎭

MakeInstance(SimpleHostingDeployment) ← ⎰ 314          FIG. 3A
```

```
class Params(std.Parameters):                                    ⎫
    single_node = True                                           ⎪
    frontend_ip = []                                             ⎪
    serving_domain = 'example.com'                               ⎪
    doc_root = str                                               ⎪ 320
    mysql_datafolder = 'mysql'                                   ⎬
    mysql_pdname = 'mysql_pd'                                    ⎪
    mysql_pd_mount_point = '/mnt/scratch0'                       ⎪ 322
    pd_size_gb = 10                                              ⎪
    def UpdateRoleParamsWithDbDetails(role_params):              ⎪
        if role_params:                                          ⎭
            role_params.update({'db_user': 'admin', 'db_passwd': 'password', 'db': 'production'})

class FrontendVM(utils.ConfiguratorLAMP):                        ⎫
    name = 'apache'                                              ⎬ 324
    def staticIP(frontend_ip):                                   ⎪
        return frontend_ip                                       ⎭ class DatabaseVM(utils.ConfiguratorLAMP):                        ⎫ 326
    name = 'mysql'                                               ⎭ class MysqlPD(std.PersistentDiskSpec):                           ⎫
    def name(mysql_pdname):    return mysql_pdname               ⎪ 328
    def sizeGb(pd_size_gb):    return pd_size_gb                 ⎬
    def mountPoint(mysql_pd_mount_point):    return              ⎪
mysql_pd_mount_point                                             ⎭ class FrontendRole(std.Role):                                    ⎫
    roleName = "lamp_frontend"                                   ⎪
    moduleName = 'lamp'                                          ⎪
    vms = [FrontendVM]                                           ⎪ 330
    def roleParams(serving_domain, doc_root):                    ⎬
        role_params = {                                          ⎪
            'serving_domain': serving_domain,                    ⎪
            'doc_root': doc_root,                                ⎪
        }                                                        ⎪
        UpdateRoleParamsWithDbDetails(role_params)               ⎪
        return role_params                                       ⎭ class DatabaseRole(std.Role):                                    ⎫
    roleName = "lamp_backend"                                    ⎪
    moduleName = 'lamp'                                          ⎪
    persistentDisks = [MysqlPD]                                  ⎪
    def roleParams(mysql_pd_mount_point, mysql_datafolder):      ⎪ 332
        role_params = {'mysql_datadir': mysql_pd_mount_point + '/' + ⎬
            mysql_datafolder}                                    ⎪
        UpdateRoleParamsWithDbDetails(role_params)               ⎪
        return role_params                                       ⎪
    def vms(single_node):                                        ⎪
        if single_node:                                          ⎪
            return [FrontendVM]                                  ⎪
        else:                                                    ⎪
            return [DatabaseVM]                                  ⎭ class HttpFirewall(utils.PublicTCPFirewall):                     ⎫ 334
    ports = ['80']                                               ⎭
```

FIG. 3B

```
utils = Include('../lib/utils.pi')  ⎱ ⟵ 342
lamp = Include('lamp.pi')           ⎰
```
⟵ 340

```
class Params(lamp.Params):  ⎱ ⟵ 344
  doc_root = '/var/www/mantis'  ⎰
```

```
class MantisPackage(std.DataPackage):  ⎫
  src = 'mantis'                       ⎬ ⟵ 346
  dst = '/usr/data/mantis'             ⎭
```

```
class MantisFrontendRole(lamp.FrontendRole):                    ⎫
  roleName = 'mantis_frontend'                                  ⎪
  moduleName = 'mantis'                                         ⎪
  dataPackages = [MantisPackage]                                ⎬ ⟵ 348
  def roleParams():                                             ⎪
    role_params = Get().copy()                                  ⎪
    db_host = std.GetHostnames(MantisDatabaseRole)[0]           ⎪
    role_params.update({'db_host_name': db_host})               ⎪
    return role_params                                          ⎭
```

```
class MantisDatabaseRole(lamp.DatabaseRole):                    ⎫
  roleName = 'mantis_backend'                                   ⎪
  moduleName = 'mantis'                                         ⎪
  def roleParams():                                             ⎬ ⟵ 350
    role_params = Get().copy()                                  ⎪
    frontend_host = std.GetHostnames(MantisFrontendRole)[0]     ⎪
    role_params.update({'frontend_hostname': frontend_host})    ⎪
    return role_params                                          ⎭
```

```
class MantisFirewall(lamp.HttpFirewall):  ⎱ ⟵ 352
  target = MantisFrontendRole             ⎰
```

```
class MantisDeployment(utils.BaseDeployment):        ⎫ ⟵ 354
  roles = [MantisFrontendRole, MantisDatabaseRole]   ⎬
  firewalls = [MantisFirewall]                       ⎭
```

MakeInstance(MantisDeployment) ⟵ 356

CLOUD-BASED DEPLOYMENT USING OBJECT-ORIENTED CLASSES

CROSS-REFERENCE TO RELATED APPLICATIONS

This application is a continuation application of, and claims priority to, U.S. patent application Ser. No. 15/050,137, titled "Selection of Ranked Configurations," filed on Feb. 22, 2016, which is a continuation of, and claims priority to, U.S. patent application Ser. No. 13/421,124, filed on Mar. 15, 2012, which application claims the benefit under 35 U.S.C. § 119(e) of U.S. Provisional Application No. 61/453,478, filed Mar. 16, 2011. The disclosure of each of the foregoing applications is incorporated herein by reference.

BACKGROUND

This specification relates generally to cloud computing.

Cloud computing is a computing model developed to enable convenient, on-demand network access to a shared pool of configurable computing resources (e.g., networks, servers, storage, applications, and services) that can be provisioned and released quickly, dynamically, and with minimal manual management efforts and human interactions with the service providers.

A few common cloud-based service models include, Software (e.g., commercially-available software applications) as a Service (SaaS), Platform (e.g., hosting environment of software applications, such as virtual machines or application frameworks) as a Service (PaaS), and Infrastructure (e.g., compute power, storage, database, networking services, etc.) as a Service (IaaS). Before a cloud-based service is made available to a cloud-service customer, various aspects of the service are configured according to a configuration specification, such that when the service is deployed, it meets the customer's needs and usage demand.

SUMMARY

This specification describes technologies relating to use and management of cloud computing environments.

In general, another innovative aspect of the subject matter described in this specification can be embodied in methods that include the actions of: providing a plurality of class definitions for selection, each class definition modeling a respective data or functional component of a cloud-based environment using a group of configurable class parameters, each class definition supporting instantiation and inheritance of the class definition in a configuration specification for a cloud-based deployment; deriving respective performance metrics associated with each of the plurality of class definitions based on aggregated performance of multiple cloud-based deployments, wherein the multiple cloud-based deployments had been carried out according to respective configuration specifications that require instantiation of the class definition or a new class definition derived from the class definition; and utilizing the respective performance metrics associated with each of the plurality of class definitions in ranking the plurality of class definitions.

These and other embodiments can each optionally include one or more of the following additional features. Categorizing the plurality of class definitions based on the respective data or functional components of the cloud-based environment modeled by the plurality of class definitions; and ranking the plurality of class definitions within the class definitions' respective categories. Providing the plurality of class definitions for selection further comprises: providing the respective performance metrics with each of the plurality of class definitions for user review in a selection user interface. For each of the plurality of class definitions: identifying a plurality of cloud-based deployments that had been carried out according to respective configuration specifications that required instantiation of the class definition or at least one new class definition derived from the class definition; monitoring respective performances of the plurality of cloud-based deployments; and associating the respective performances of the plurality of deployments with the class definition. Deriving respective performance metrics associated with each of the plurality of class definitions based on aggregated performance of multiple cloud-based deployments further comprises: for each of the plurality of class definitions: identifying one or more data or functional components in the plurality of cloud-based deployments that were configured according to the class definition or a new class definition derived from the class definition; identifying one or more performance metrics associated with the identified one or more data or functional components; and deriving the respective performance metrics associated with the class definition by aggregating the identified one or more performance metrics.

These and other embodiments can each optionally include one or more of the following additional features. The performance metrics include one or more measures of latency, reliability, scalability, availability, or security. For each of the plurality of class definitions: tracking a respective count of cloud-based deployments that have been configured at least in part according to the class definition; and utilizing the respective counts associated with the plurality of class definitions in the ranking of the plurality of class definitions. For each of the plurality of class definitions: tracking a respective count of problems encountered in cloud-based deployments that have been configured at least in part according to the class definition; and tracking a number of required changes to resolve the problems encountered in the cloud-based deployments that have been configured at least in part according to the class definition; and utilizing the respective counts of the problems and the respective numbers of required changes associated with the plurality of class definitions in the ranking of the plurality of class definitions.

These and other embodiments can each optionally include one or more of the following additional features. The respective numbers of required changes associated with the plurality of class definitions are used to calculate respective weights given to the respective performance metrics associated with the plurality of class definitions in ranking the plurality of class definitions. Receiving a respective definition submission from each of a plurality of definition suppliers, wherein the respective definition submission includes one or more class definitions written in a specification language, and each class definition models a data or functional component of a cloud-based deployment using a group of configurable class parameters and is extendable to create at least one new class definition by a modification to one or more of the group of configurable class parameters or an addition of one or more new class parameters; providing a user interface that presents the class definitions received from the plurality of definition suppliers, for review and selection by a plurality of definition users. Receiving a plurality of distinct configuration specifications written in the specification language, the plurality of distinct configuration specifications each for configuring a distinct cloud-based deployment and including a distinct class definition that extends from a same one of the class definitions received from the plurality of definition suppliers; and configuring each of the distinct cloud-based deployments based at least on the same one of the received class definitions and the distinct class definition that extends therefrom in the distinct configuration specification of the distinct cloud-based deployment.

These and other embodiments can each optionally include one or more of the following additional features. For each of the received class definitions: monitoring usage of the class definition in a plurality of configuration specifications that have been used to configure a plurality of cloud-based deployments; and recording, for each use of the class definition in the plurality of configuration specifications, a credit to a definition supplier of the class definition and a charge to a definition user associated with the use. The usage of the class definition includes an instantiation of the class definition in a respective configuration specification that has been used to carry out a respective cloud-based deployment. The usage of the class definition includes an extension of the class definition to create a new class definition that is instantiated in a respective configuration specification used to carry out a respective cloud-based deployment. Receiving a software submission from a software supplier, the software submission including a software application to be deployed in a cloud-based environment and a plurality of distinct configuration specifications each for deploying the software application in the cloud-based environment in a distinct manner; and providing the plurality of distinct configuration specifications for review and selection by a software user. Receiving selection of one of the plurality of distinct configuration specification by the software user; deploying the software application in the cloud-based environment according to the selected distinct configuration specification; and recording a charge to the software user and a credit to the software supplier based on a respective price associated the selected distinct configuration specification. Receiving, from a user, input selecting a first class definition that models a first data or functional component of the cloud-based environment; identifying one or more collections of class definitions, wherein each collection of class definitions includes the first class definition and at least one additional class definition that models a respective data or functional component other than the first data or functional component; and providing, to the user, the one or more collections of class definitions for selection.

These and other embodiments can each optionally include one or more of the following additional features. For each of the one or more collections of class definitions: identifying one or more data or functional components in a plurality of cloud-based deployments that were configured according to the class definition or a new class definition derived from the class definition; identifying one or more performance metrics associated with the identified one or more data or functional components; and deriving the respective performance metrics associated with the collection of class definitions by aggregating the identified one or more performance metrics. Receiving a selection of a collection of class definitions; identifying a configuration specification associated with the collection of class definitions; and configuring a cloud-based deployment based on the configuration specification.

In general, another innovative aspect of the subject matter described in this specification can be embodied in methods that include the actions of: modifying one or more base classes whose class definition is used in multiple of the plurality of cloud-based deployments, wherein the base classes model a respective data or functional component of a cloud-based environment using a group of configurable class parameters, and the base classes support instantiation and inheritance of the class definition; identifying a plurality of cloud-based deployments each having been carried out according to a respective configuration specification, the respective configuration specification written in a specification language, and the respective configuration specification including the modified base classes or classes that inherit the modified base classes; and reconfiguring, for each cloud-based deployment, the cloud-based deployment based on the one or more modified base classes.

These and other embodiments can each optionally include one or more of the following additional features. The data or functional component modeled by each class is one of a virtual device supporting a cloud-based environment, a service utilized in the cloud-based environment, a software role performed by an installed application in the cloud-based environment, a data package holding data to be used during deployment or operation of the cloud-based environment, or a combination of one or more thereof. The specification language supports dependency between class definitions, and a definition dependency between a first class and a second class represents a deployment dependency between respective components modeled by the first and the second class. The definition dependency between the first class and the second class is expressed by a class parameter of the first class where the class parameter of the first class refers to an instance of the second class. The specification language supports connectivity between class definitions, and a value assignment linking an instance of a second class to a class parameter of a first class represents a connectivity between respective components modeled by the first class and the second class. The specification language is object-oriented.

Other embodiments of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Particular embodiments of the subject matter described in this specification can be implemented so as to realize one or more of the following advantages.

A high-level object-oriented specification language allows configurable components of a cloud-based deployment to be modeled by a class definition that includes a group of configurable class parameters. The object-oriented specification language supports extension of an existing base class definition to create new class definitions, and supports inheritance of class parameters from the existing base class definition by the new class definitions. An administrative user of a cloud-based service can customized a cloud-based deployment based on class definitions used in configuring one or more generic deployments, such as by modifying class parameter values of the class definitions, varying interrelationships between the classes, and supplementing existing class parameters with new class parameters.

The object-oriented specification language allows multiple layers of abstraction to be made on the different types of cloud-service components that are configurable. For example, the high-level object-oriented specification language not only supports class definitions that model hardware and virtual resources, but also software roles and service roles served by software applications and services in a cloud-based deployment. In addition, the object-oriented specification language provides syntax for specifying dependency and connectivity between classes. Cloud components that involve multiple sub-components and complex structures can be modeled by class definitions that refer to multiple types of base classes and specify respective interrelationships between the base classes.

A configuration specification can rely on existing class definitions to configure some aspects of a cloud-deployment at a high level of abstraction, while customizing other aspects at a more detailed level using newly derived class definitions. An administrative user of a cloud-based service is able to control the level of customization for a cloud-based deployment by choosing an appropriate set of class definitions to include and instantiate in the configuration specification for the cloud-based deployment.

In addition, the object-oriented specification language allows many class definitions that model common or special purpose cloud-service components to be created and stored. These stored class definitions can be extended or reused as is in configuration specifications of future deployments by different cloud-service customers. This reuse of class definitions in specification configurations can improve the speed and efficiency of the deployment process.

Because class definitions can be reused and shared among many cloud-service customers, the efforts for developing suitable configuration specifications for the same or similar purposes do not have to be duplicated by the cloud-service customers. A marketplace for sharing reusable class definitions can be developed, such that a cloud-service customer can choose to purchase or license the use of existing class definitions developed and provided by other cloud-service customers for a fee. In addition, software applications can be provided with different types of configuration specifications (i.e., as "config-wrapped" software solutions) that are suitable for different usage demands and organizational infrastructures of the cloud-customers.

When a configuration specification of a cloud-based deployment is written in the object-oriented specification language, the cloud-service provider is able to parse the configuration specification to identify the class definitions that are involved in configuring each data or functional component of the cloud-based deployment. Further, when the deployment is carried out according to the configuration specification, the cloud-service provider is also able to identify the underlying software or virtual resources associated with each of the data or functional components of the deployment. Therefore, the object-oriented specification language enables the cloud service provider to monitor the performance of the data and functional components of the cloud-based deployment, and associate the performance with the class definitions that are used to configure each of the data and function components. Thus, the cloud-service provider can provide guidance to the cloud-service customers on which parts of the configuration specification needs to be modified to improve the performance of the deployment.

In some implementations, the cloud-service provider can generate a block diagram for the cloud-based deployment based on the configuration specification. The performance of the different components of the deployment can be visually represented on the block diagram. Various reconfiguration triggers specified in the configuration specification can also be represented in the block diagram. This visual representation allows an administrator of the cloud-based deployment to adjust the configuration parameters of the deployment timely and appropriately.

The object-oriented specification language allows class definitions to be reused in multiple configuration specifications, and potentially by multiple cloud-service customers. The cloud-service provider can track the performances of multiple cloud-based deployments that have been configured using configuration specifications involving reused class definitions. For each reused class definition, the cloud-service provider can evaluate the quality of the class definition based on the aggregated performance of the multiple deployments that have been configured using the class definition. In a marketplace for sharing reusable class definitions, a ranking or quality scores of the class definitions based on the quality of the class definitions can be provided. This ranking or quality scores help cloud-service customers to better select the class definitions to reuse in their own cloud-based deployments. The ranking or quality scores may also help providers of reusable class definitions to improve their class definitions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A is an example configuration specification written in an example object-oriented specification language.

FIG. 3B is an example module that includes reusable class definitions written in the example object-oriented specification language.

FIG. 3C is an example configuration specification that utilizes the reusable class definitions shown in FIG. 3B.

Like reference numbers and designations in the various drawings indicate like elements.

DETAILED DESCRIPTION

In a cloud computing environment, cloud-service customers (e.g., end users or enterprises) obtain access to software, platform, and/or infrastructure services through one or more networks (e.g., the Internet). The cloud-service customers are able to scale the service level (e.g., in terms of service type, quality, and amount) up and down as needed, for example, through configuration user interfaces provided by the cloud-service providers, and/or through programmably-established configuration specifications stored at the cloud-service providers. Correspondingly, a cloud-service provider pools resources and serves its customers via a multi-tenant model, where physical and virtual resources are assigned and reassigned, configured and reconfigured according to customer demands. The locations of the physical resources underlying the cloud infrastructure are not exposed to the cloud-service customers and can change dynamically.

Figure 1:
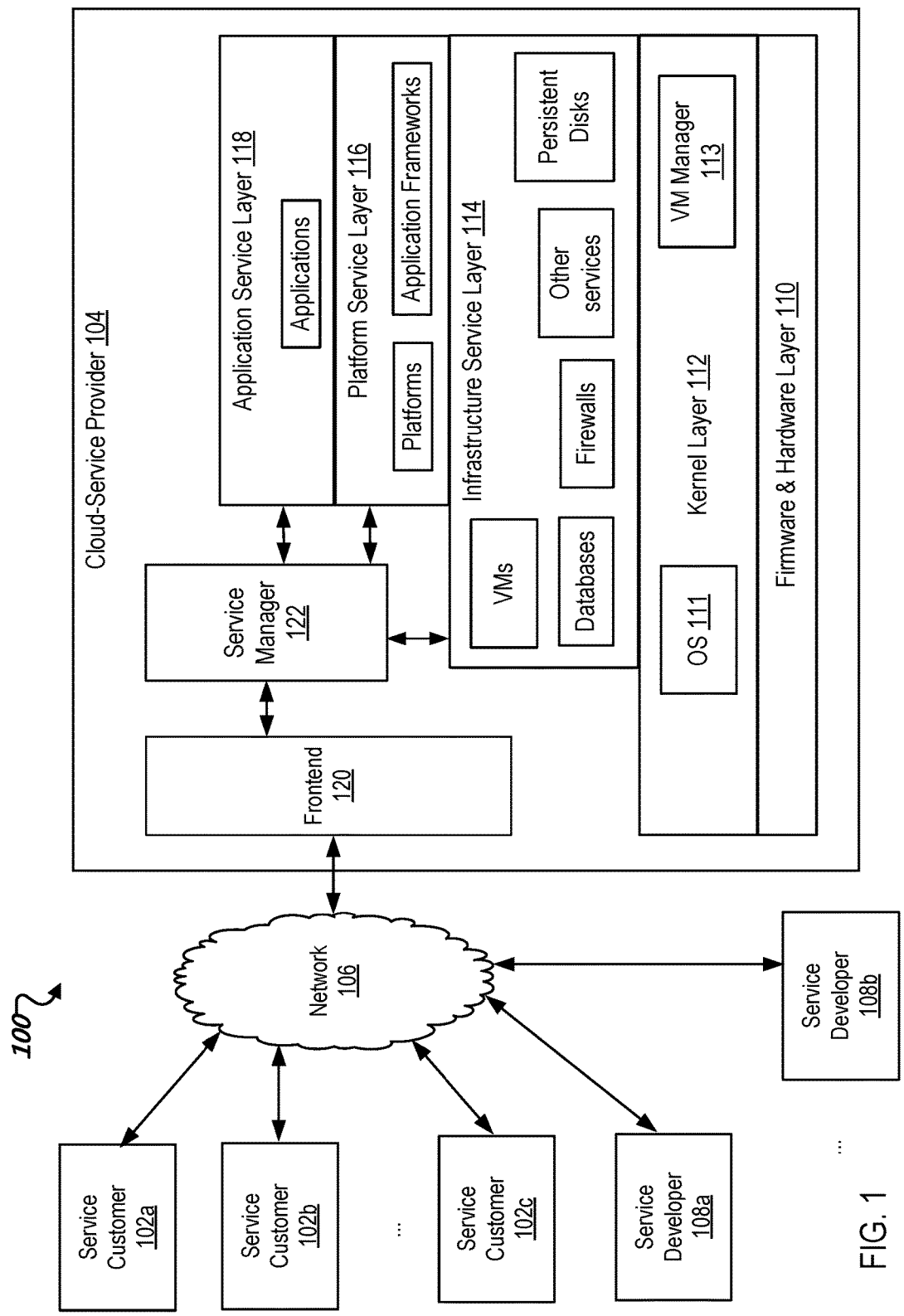
FIG. 1 illustrates an example cloud-computing environment.

FIG. 1 is a block diagram illustrating an example cloud-computing environment 100. In the example cloud-computing environment 100, cloud-service customers (e.g., service customers 102a, 102b, and 102c) communicate with a cloud-service provider 104 using a customer device through one or more networks 106. The cloud-service customers include end users of software applications provided by the cloud-service provider 104, such as in a "Software as a Service" (SaaS) model. The cloud-service customer can also include enterprise customers that receive platform and/or infrastructure services from the cloud-service provider 104, such as in the "Platform as a Service" (PaaS) and/or "Infrastructure as a Service" (IaaS) models. The software application services, platform services, and infrastructure services provided by the cloud-service provider 104 are developed by in-house or third-party service developers 108, and made available to the cloud-service customers through the cloud-service provider 104. A cloud-service customer may employ more than one type of services from the cloud-service provider 104.

In one example, the cloud-service provider 104 is conceptually structured in multiple layers. The lowest layer is the firmware and hardware layer 110 on which other layers of the cloud-service provider 104 are built. The firmware and hardware layer 110 includes generic contributing nodes (e.g., data centers, computers, and storage devices) geographically distributed across the Internet and provide the physical resources for implementing the upper layers of the cloud service provider 104.

Above the firmware and hardware layer 110 is the software kernel layer 112. The software kernel layer 112 includes the operating system 111 and/or virtual machine manager 113 that host the cloud infrastructure services provided by the cloud-service provider 104. The software kernel layer 112 controls and communicates with the underlying firmware and hardware layer 110 through one or more hardware/firmware-level application programming interfaces (APIs). The hardware/firmware-level APIs can be provider-specific and implemented to support Hypertext Transfer Protocol (HTTP) and HTTP Secure (HTTPS) based communications protocols. Examples of provider-specific APIs include Amazon Web Services APIs, Google App Engine APIs, and Microsoft SQL Azure APIs.

The infrastructure services provided by the cloud-service provider 104 include virtualized resources, such as virtual machines, virtual storage (e.g., virtual disks), virtual network appliances (e.g., firewalls), and so on. The infrastructure servicers also include virtualized services, such as database services, networking services, file system services, web hosting services, load balancing services, MapReduce services, message queue services, map services, e-mail services, and so on. Each of these infrastructure services can be employed by a cloud-service customer and deployed in an infrastructure service layer 114 above the software kernel layer 112.

The scale and various aspects (e.g., data, connectivity, and dependency relationships within and between service components) of an infrastructure service deployment are configurable by an administrator user of the cloud-service customer. In one example, the administrator user submits a configuration specification to the cloud-service provider 104 via a frontend interface 120 of the cloud-service provider 104. The cloud-service provider 104 translates the configuration specification into instructions (e.g., API calls) to the infrastructure service layer 114 and the kernel layer 112 according to the APIs of the involved infrastructure services and the APIs of the underlying software kernel layer 112. These instructions are executed to provision and configure the infrastructure services requested in the configuration specification of the deployment. For example, a configuration specification can be translated into infrastructure and kernel level APIs calls that create, re-create, move, or delete components (e.g., virtual machines and services) and assign or change attributes (e.g., memory and CPU allocations, network settings, disk sizes and volumes) of the components.

In addition to the infrastructure services, the example cloud-service provider 104 also provide platform services, such as an environment (e.g., Linux, Solaris, Microsoft Windows, etc.) for running virtual machines or a framework (e.g., .NET, Java, Oracle Database, etc.) for developing and launching a particular type of software applications. The platform services are implemented in a platform service layer 116 over the infrastructure service layer 114, and can employ one or more infrastructure services configured in a particular manner. Configuration of platform services can be accomplished by program code written according to the APIs of the platform services and, optionally, the APIs of the infrastructure services that are employed in enabling the platform services.

In this example, the cloud-service provider 104 also provides software application services in an application service layer 118. A software application (e.g., a commercially-available software application) can be installed on one or more virtual machines or deployed in an application framework in the platform service layer 116. The software application can also communicate with one or more infrastructure service components (e.g., firewalls, databases, web servers, etc.) in the infrastructure layer 114. The installation and configuration of the software application in the application service layer 118 can be accomplished through APIs of the software itself and the APIs of the underlying platform and infrastructure service components.

To manage the deployment and operation of the cloud-based services provided to the cloud-service customers (e.g., 102a, 102b, 102c), the example cloud-service provider 104 includes a cloud-service manager 122. The example cloud-service manager 122 communicates with the frontend interface 120 to receive service requests from the cloud-service customers. The example cloud-service manager 122 is further responsible for the managing of the cloud resources and services, including service enrollment, provisioning, coordination, monitoring, scheduling, etc. As described in this specification, the example cloud-service manager 122 also includes tools and libraries for translating the user requirements (e.g., as expressed in one or more configuration specifications and service level agreements (SLAs)) in the different service layers (e.g., the layers 114, 116, and 118) into physical resources demands (e.g., as expressed in one or more kernel and hardware/firmware-level API calls).

Although the example cloud-service provider 104 provides all three types of cloud-based services, in some implementations, fewer or more types of services may be provided. In some implementations, the cloud-service provider 104 may outsource some of the cloud services or portions of a service to other cloud-service providers. The cloud-service manager 120 may implement API calls to these other cloud-service providers for supporting some of its services to the cloud-service customers. In addition, the conceptual layers of the cloud-service provider 104 shown in FIG. 1 are merely illustrative. Other conceptual structure of a cloud-service provider may be provided, for example, depending on the types of services actually offered by the cloud-service provider.

In this example, the cloud-service customers can employ cloud-based services offered in each of the services layers 114, 116, and 118. Depending on the type of services that a cloud-service customer has employed, the cloud-service customer is granted different levels of control in configuring the services. For example, if a software application service is employed, an administrator user of the cloud-service customer is given control over how the software application is configured, but controls over the underlying platform and infrastructure services supporting the software application remains with the cloud-service provider 104. If a platform service is employed, an administrative user of the cloud-service customer is given control over how the platform and/or application frameworks are configured, but the control over the infrastructure services that support the platform and/or application frameworks remains with the cloud-service provider 104. Similarly, if infrastructure services are employed, an administrative user of the cloud-service customer is given control over the particular infrastructure services employed, but not the underlying kernel layer 112 and firmware and hardware layer 110.

In the cloud-computing environment 100, the cloud-service customers access the cloud-based services using data processing apparatus such as personal computers, smart phones, and tablet computers. Depending on the type of service being employed, different user interfaces or programming interfaces may be used to communicate with the cloud-service provider 104.

For example, if a software application service is being employed, an end user can access and use the software application through a web browser. If platform or infrastructure services are being employed, a user of the service (e.g., an administrator user of a cloud-service customer) can access a configuration user interface that includes administrative functions to control and configure the services. The administrative functions include, for example, starting or stopping virtual machines, managing cloud storage, installing and deploying software on virtual machines, or setting up web servers, etc. In addition, a cloud-service provider 104 can optionally allow an administrator user of a cloud-service customer to write program code according to various provider-, platform-, framework-, and/or service-dependent application program interfaces (APIs) to control and configure various aspects of the services that the cloud-service customer receives. In some implementations, if an open standard is used for a cloud-computing environment, provider-, platform-, framework-, and service-independent APIs can be used to control and configure the services as well.

When configuring a cloud-based service for deployment, a service user or service developer provides one or more configuration files to the cloud-service provider 104. The configuration files set forth the desired initial state of the service expressed in terms of various configuration parameters. Typically, the configuration file is written in a structured way according to the rules and syntax provided or recognized by the cloud-service provider 104, such that the configuration file will be parsed and interpreted correctly by the cloud-service provider 104.

Figure 2A:
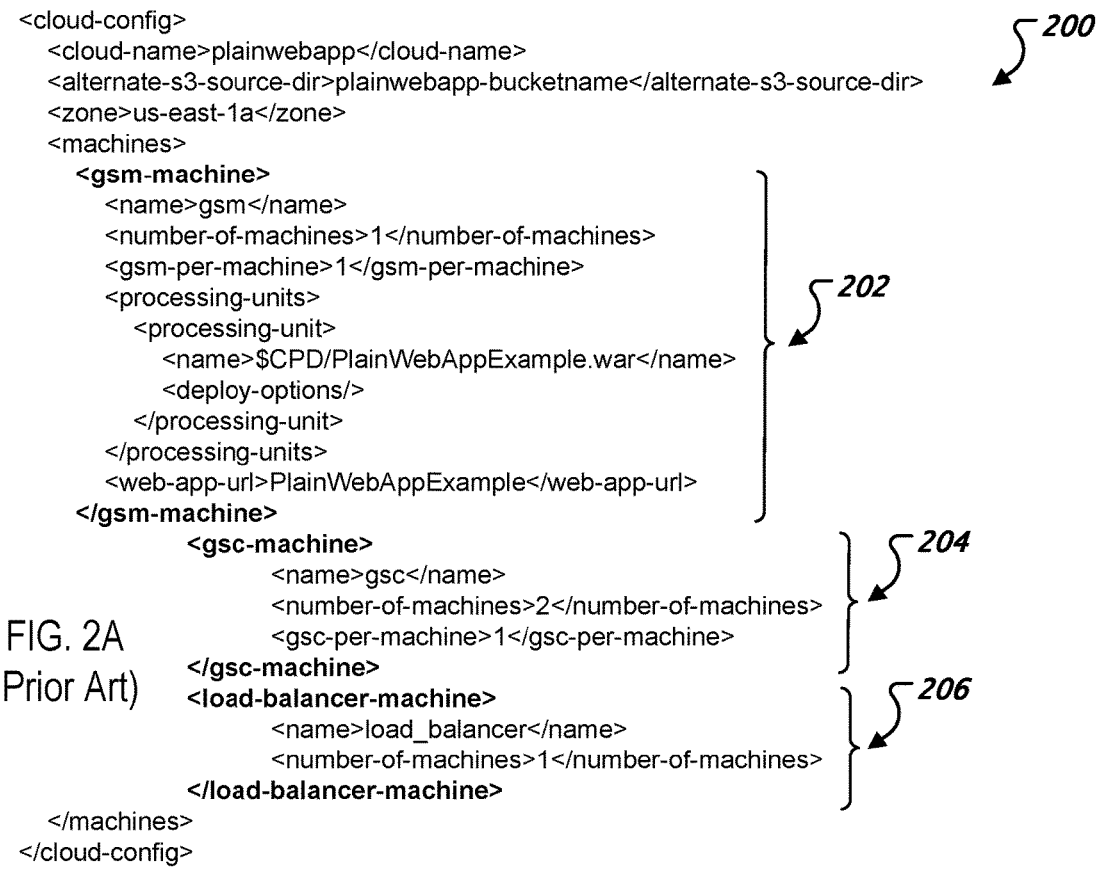
FIG. 2A shows an example of a conventional configuration specification for a cloud-based deployment.

FIG. 2A is an example of a conventional configuration specification 200 for deploying a simple web application in a cloud-computing environment. The example configuration specification 200 is written in an Extensible Markup Language (XML), which is a commonly used language for specifying configurations for cloud-based deployments. The example configuration specification 200 is provided to a cloud-service provider in a text file. The cloud-service provider uses tools (e.g., a parser or API translator) that parse the configuration file according to the markups (e.g., the MXL tags, elements, and attributes, etc.) in the configuration file and converts the requirements specified in the configuration file into one or more sets of API calls. After the appropriate sets of API calls are determined, the cloud-service provider executes the API calls to carry out the deployment according to the requirements set forth in the configuration file.

Figure 2B:
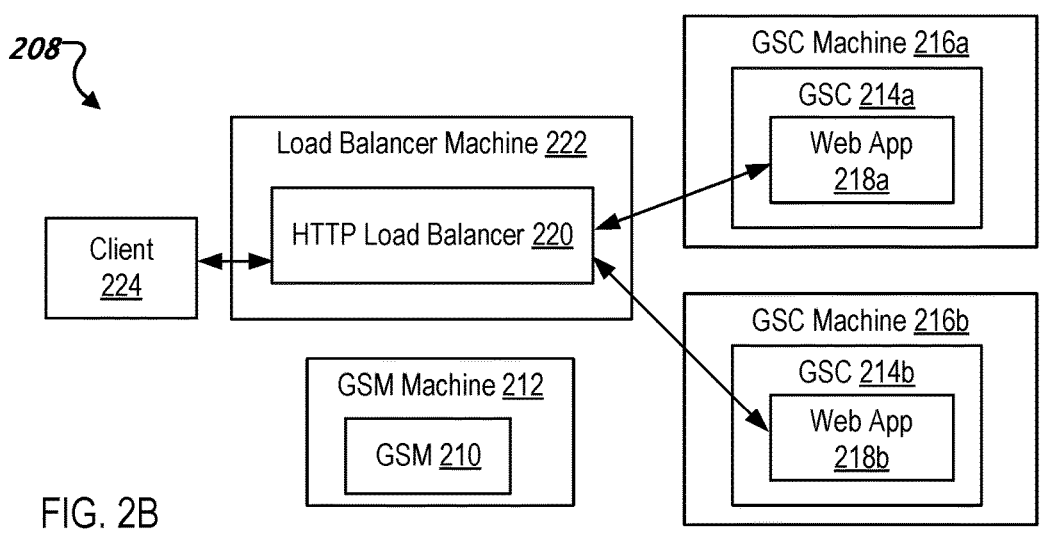
FIG. 2B illustrates a resulting topology of the cloud-based deployment configured according to the configuration specification shown in FIG. 2A.

FIG. 2B illustrates the resulting topology 208 of the web application service after it is deployed according to the configuration specification 200. First, according to the code block 202, a single Grid Service Manager (GSM) 210 is deployed on a single GSM virtual machine 212. After the GSM 210 is deployed on the GSM machine 212, two Grid Service Containers (GSCs) 214a and 214b are deployed, each GSC on a respective GSC machine (216a or 216b), as specified by code block 204. Then, according to the code block 202, the GSM installs a copy of the web application software (e.g., application copy 218a or 218b) within each of the two GSCs 214a and 214b. According to code block 206, a load balancer service 220 is started on a load balancer machine 222, and used to direct traffic (e.g., HTTP requests from client browsers 224) to the two GSC machines 216a and 216b, and to funnel back responses prepared by the web applications running on the GSC machines 216a and 216b.

As illustrated in FIGS. 2A and 2B, the example conventional configuration specification 200 relies on nested markup constructs (e.g., code blocks 202, 204, and 206) to describe the components of a deployment and relationships among the components. The user writing the configuration specification 200 needs to be familiar with the details within each markup construct that goes into the configuration specification 200 and the markup construct's meaning to the API translator of the cloud-service provider. For a large and complex deployment, the configuration file can become very long and complex with many layers of markups and duplicate statements. Furthermore, the possibility of code reuse decreases as a configuration specification becomes long and complex, because customization of the configuration specification for another deployment would require many changes and debugging the customized configuration file would also become more difficult.

As disclosed in this specification, instead of providing a configuration specification written in a markup language or through a graphical user interface, a cloud-service customer or service developer can provide a configuration specification written in a high-level object-oriented specification language. The high-level object-oriented specification language allows components (e.g., infrastructures, storage devices, services, software package to be installed, and "software roles" played by installed software applications) of a cloud-based deployment to be specified as instances of one or more reusable and modifiable classes, where each class models a component of the deployment using a group of configurable class parameters. The value of each class parameter can be specified, reused, or modified for particular deployments using the syntax and functions provided by the object-oriented specification language. The instance of each reusable and modifiable class declares the desired state of the component that is modeled by the class.

As described in this specification, inheritance of class definitions is supported by the high-level object-oriented specification language. New class definitions can be provided based on statements relating or modifying one or more existing class definitions using the high-level specification language. Statements relating different classes capture the relationships between multiple aspects (e.g., data or functional components) of a deployment. Examples of such relationships include the dependencies between software installations and service activations in a deployment, the connectivity between multiple software roles in a deployment, and the connectivity between a software role and a service or virtual device in a deployment. New class definitions can also be created by extending an existing class definition with the addition of new class parameters and/or methods. A user can customize a deployment by specifying a new class derived from one or more existing base classes and instantiate the new class.

According to this specification, a cloud-service provider is able to compile a configuration specification written in the high-level object-oriented specification language into a set of API calls, based on the requirements specified by the class definitions included in the configuration specification. The inclusion of a class definition in a configuration specification refers to a request in the configuration specification to instantiate the class definition or to instantiate a new class definition derived from the class definition.

In some implementations, different service layers of the cloud-service provider and different services within the same layer have different APIs. To compile the configuration specification written in the object-oriented specification language, the cloud-service provider stores a set of rules and protocols for translating each of a set of most basic class definitions (or core class definitions) of the specification language to a respective group of API calls. The group of API calls for each core class definition conforms to the API of the type of components modeled by the core class definition. The compiler is then able to use the set of rules and protocols to translate all class definitions derived from the core class definitions into an appropriate combination of API calls to configure all of the components of a particular deployment. In some implementations, the API calls are sent to and executed on one or more servers of the cloud-service provider. Alternatively, some of the API calls may be passed to an intermediary component of the cloud-service provider or a third-party service provider, where the API calls are further processed into lower-level API calls and carried out by the sub-components of the intermediary component or third-party service provider.

In some implementations, the high-level object-oriented specification language also includes syntax for specifying triggers for scaling or dynamically reconfiguring various aspects of the deployment. For example, a class definition that models a virtual machine can include one or more class parameters for a scaling policy, such that the compiler can derive API calls to dynamically adjust the number of virtual machines deployed based on various performance metrics monitored by the cloud-service manager (e.g., the cloud-service manager 122 shown in FIG. 1).

The following examples (shown in FIGS. 3A-3C) illustrate the syntax and various properties of an example object-oriented specification language, and how a cloud-based deployment can be specified according to the example object-oriented specification language, and based on existing and newly derived class definitions.

In the first example, an example configuration specification 300 written in an example object-oriented specification language is shown in FIG. 3A. The deployment made according to this configuration specification 300 is for launching a virtual machine with a web server (e.g., an Apache web server) installed and serving the files present in a data package.

This example assumes the existence of a number of base class definitions that the compiler is able to parse and translate to API calls. The existing base class definitions include a set of core class definitions provided by the compiler and possibly other class definitions that extend from one or more of the core class definitions either directly or via one or more intermediate class definitions.

In some implementations, the existing base class definitions are grouped into modules (e.g., modules "utils," "std" shown in FIG. 3A), and classes included in each module are referenced in a configuration specification by a module name followed by a class name (e.g., "std.Parameters," "utils.ConfiguratorLAMP," "std.DataPackage," "std.Role," "utils.PublicTCPFirewall," "utils.BaseDeployment" as shown in the specification 300). Each of the base class definitions specifies an initial configuration state of a corresponding component of a cloud-based deployment, subject to the modifications and component relationships set forth in the configuration specification 300.

As shown in FIG. 3A, the configuration specification 300 includes new class definitions that extend from the existing base class definitions. For example, a new class "Params" extends from the base class "std.Parameters," a new class "SimpleHostingPackage" extends from the base class "std.DataPackage," a new class "SimpleHostingVM" extends from the base class "utils.Configurator.LAMP," a new class "SimpleHostingRole" extends from the base class "std.Role," a class "SimpleHostingFirewall" extends from the base class "utils.PublicTCPFirewell," and a class "SimpleHostingDeployment" extends from the base class "utils.BaseDeployment," as shown by the new class definitions 302, 304, 306, 308, 310, and 312, respectively. The configuration specification 300 triggers the deployment of a simple hosting application by creating an instance of the "SimpleHostingDeployment" class (e.g., as shown by statement 314), which in turn creates instances of other classes from which the "SimpleHostingDeployment" class is derived.

In this example, the "SimpleHostingDeployment" class definition 312 customizes the definition of the base class "utils.BaseDeployment" by modifying two class parameters, a "roles" parameter and a "firewall" parameter. The "roles" parameter specifies the respective software roles that one or more installed software packages are supposed to play in the deployment. The "firewall" parameter specifies that a firewall service is to be included as part of the deployment. In this case, the class definition 312 specifies that a single software role is to be included, which is represented by an instance of the "SimpleHostingRole" class. The class definition 312 further specifies that the firewall service to be included in this deployment is represented by an instance of the "SimpleHostingFirewall" class. According to the properties of the object-oriented specification language, the "SimpleHostingDeployment" class inherits other class parameters defined in the base class "utils.BaseDeployment" without further modification. These other class parameters describe other aspects of the deployment that need not be further customized for this simple hosting deployment.

According to the class definition 312, instantiation of the "SimpleHostingDeployment" class requires instantiation of the "SimpleHostingRole" and the "SimpleHostingFirewall" classes as well. As shown in FIG. 3A, the "SimpleHostingRole" class definition 308 extends from the base class "std.Role." Both classes are based on a "software role" model that categorizes a software installation according to the role that the software installation plays in a cloud-based deployment. For example, a software package may be installed to play a role of a webhost, a frontend, a backend, a communication interface, and so on. Depending on the particular role that a software installation plays, different parameters may be used to configure the software installation. Each configurable parameter for the software role can have a corresponding class parameter or function in the class definition created based on the "software role" model.

In one example, in addition to an identifier or name of the role that the software installation plays in a deployment, a "software role" model can include model parameters for configuring various aspects of the software installation, including the virtual machines on which the software is to be installed, the location of the software binary, instructions on which installer program should be used to install the software, and so on. If the software installation requires other services or software installations to be performed first, this dependency is optionally included in the "software role" model as well. Example of dependency relationships are "start after" or "stop before." Other dependency types (e.g., install on the same virtual machine, etc.) can be supported as well.

In this example in FIG. 3A, the class definition 308 for the "SimpleHostingRole" class specifies that the role of the software installation in the deployment is to serve as a "webhost." How the "webhost" software is to be deployed is made known to the compiler through the class definition of the "simplehosting.webhost" class. In this example, the "simplehosting.webhost" class definition includes the configurations of a simple apache web server, which is already written and made known to the compiler. When the "SimpleHostingRole" class is instantiated, the "simplehosting.webhost" class is instantiated as well.

The class definition 308 for the "SimpleHostingRole" class further declares that the data package that is needed to run this webhost is represented by an instance of the "SimpleHostingPackage" class, and that the webhost is to be installed on virtual machines that are represented by instances of a "SimpleHostingVM" class.

In this example, each of the "roleName," "moduleName," "dataPackages," and "vms" are parameters of the "std.Role" class, and are customized in the "SimpleHostingRole" class definition 308. Other class parameters of the "std.Role" class are inherited by the "SimpleHostingRole" class without modification.

The class definition 308 of the "SimpleHostingRole" class also defines a few new parameters, such as the "serving_domain" and "document_root" parameters whose values are assigned either indirectly through another parameter name (e.g., "serving_domain" of the "Params" class 302) or by a direct value entry (e.g., "/var/www/static"). In this example, only one software role is defined, so no dependency between software roles is specified for the software role (e.g., the "SimpleHostingRole") in terms of installation or execution.

With respect to the firewall component of the deployment, the class definition 310 of the "SimpleHostingFirewall" class is based on the existing "utils.PublicTCPFirewall" class definition. In this example, the "utilis.PublicTCPFirewall" class defines a public firewall with Transmission Control Protocol (TCP) set as the protocol. The only parameters of the "PublicTCPFirewall" class that are modified for this deployment are the "target" and "ports" parameters. In the class definition 310, the target of the firewall is represented by an instance of the "SimpleHostingRole" class, while the port of the firewall is set to port "80." Other parameters (e.g., the "source" and the "protocol" parameters) that are needed to configure the firewall are specified in the base class definition of "PublicTCPFirewall" and are inherited by the "SimpleHostingFirewall" class without modification. In this example, a connectivity between the firewall component and the simple hosting software role (e.g., represented by an instance of the "SimpleHostingRole" class) is specified by the value assignment to the "target" parameter.

In this example, the class definitions of the "SimpleHostingFirewall" and the "utils.PublicTCPFirewall" classes are both based on a firewall service model. Unlike a "software role" model, a service model does not need to include parameters for the underlying virtual machines, disks, or software packages. Instead, these aspects are controlled by the cloud-service provider and not subject to the configuration by the users of the service. Like in a "software role" model, a service model also optionally includes parameters that specify dependences between services and between services and software roles. In this example, the firewall component is connected to the web server component, but no dependencies of the firewall service are specified for this simple hosting deployment.

As set forth earlier and shown in FIG. 3A, the class definition 308 of the "SimpleHostingRole" class requires instantiation of the "SimpleHostingPackage" class and the "SimpleHostingVM" class. The class definition 304 of the "SimpleHostingPackage" class specifies the source of the data (e.g., "data" in the current directory") that is to be copied to the virtual machine hosting the "SimpleHostingRole." The class definition 304 further specifies a destination directory (e.g., "/var/www/static") of the copied data on the virtual machine. When the deployment is carried out according to the configuration specification 300, the data package "data" is copied from the directory in which the configuration file resides, to the destination directory "/var/www/static" on the virtual machine that has been deployed according to the "SimpleHostingVM" class definition 306.

As shown in FIG. 3A, the "SimpleHostingVM" class definition 306 extends from the "utils.ConfiguratorLAMP" class definition. Both classes are based on a virtual machine model and specify how a virtual machine can be configured. In this example, the "utils.ConfiguratorLAMP" class configures a customized virtual machine that already has an Apache web server installed. Therefore, by extending from the "utils.ConfiguratorLAMP" class rather than a standard virtual machine class, a user can simplify and speed up the configuration process. The "SimpleHostingVM" class definition 306 also specifies the number of virtual machines to be deployed in this deployment and the external IP addresses to be bound to the virtual machines, through the newly added "replicas" and "staticIP" class parameters. Other parameters that are commonly used to configure a virtual machine or virtual machines for supporting a software role include, for example, configuration parameters for the CPU and memory requirements of the virtual machine(s), storage disks to be attached to the virtual machine(s), read-only storage sources attached to the virtual machine(s), IP addresses, network interfaces of the virtual machine(s), the data center location of the virtual machine(s), and so on. Each of these virtual machine model parameters is optionally included as a class parameter in a virtual machine class definition or another class that extends from a virtual machine base class definition.

Optionally, a special "Params" class is included in the configuration specification of a deployment, such as that shown in the example configuration specification 300. Parameter values can be provided in this class definition and used to assign values to parameters in other class definitions that are included in the same configuration file. For example, the values of parameters "replica_count," "serving_domain," and "ip_array" are injected into the class definitions 306 and 308 through references made to the respective names of parameters.

As illustrated in the example configuration specification 300, it is possible to create class definitions for different components of a cloud-based deployment based on different component models. A high-level object-oriented specification language can be developed based on models of various types of infrastructures, storage, services, and software roles that commonly occur in a cloud-based computing environment. Each model describes a corresponding infrastructure component, storage, service, or software role using a number of model parameters. Core class definitions that represent generic initial configuration states of some most common and basic components of the cloud-based environment can be created based on these component models. As more complex components can be built from combinations of multiple basic components, class definitions that represent the initial configuration states of more complex components can be created from multiple core class definitions and/or other class definitions that are derived from the core class definitions.

A compiler of the high-level object-oriented specification language is created to parse the class definitions created based on these component models, extract the configuration requirements expressed by the values of the class parameters, and translates the requirements into a proper set of API calls for configuring the types of components represented by these component models. In some implementations, a compiler is implemented as a software program or script that reads a configuration file and outputs a set of API calls. In some implementations, the compiler also direct the API calls to appropriate components of the cloud-service provider or third-party providers for execution.

The example in FIG. 3A has illustrated class definitions developed based on an example software data package model, an example virtual machine model, an example "software role" model, an example firewall service model, and an example deployment model, respectively. As an additional example, an example storage model includes model parameters for configuring aspects of a storage option of a deployment, such as the size of the storage, mounting points of the storage, and so on. In some implementations, a storage model optionally includes a scaling policy for dynamically adjust the size of the storage based on monitored usage of the storage. Furthermore, in addition to a firewall service, a cloud-based environment can include many platform and infrastructure services, such as a database service, a message queue service, a load balancing service, a map service, a MapReduce service, and so on. Different service models can be developed for each of these cloud-based services, and class definitions for configuring the different services can be created based on the different service models.

As illustrated by the example of FIG. 3A, an object-oriented specification language enables the creation of class hierarchies that represent different levels of customization for components in various layers of the cloud-computing environment. A configuration specification written in the object-oriented specification language can reuse existing class definitions, either by extending from an existing class definition or referring to an instance of an existing class definition when assigning a value to a class parameter. Reusing existing class definitions simplifies the configuration specification for a new deployment. Furthermore, when reusing an existing class definition, a user only needs to know the configuration state that can be accomplished by the existing class definition, but not all the literal details set forth within the class definition to accomplish that configuration state.

In addition, class definitions of highly complex components (e.g., components involving multiple services, multiple data sources, and multiple levels of deployments) can be developed based on multiple existing class definitions, with or without modification to the class parameters of the existing class definitions. These highly complex class definitions can be reused by a user in a new deployment, without in depth understanding of these complex class definitions on all levels.

By choosing the appropriate base classes to customize and modify in a new configuration specification, the user also gains more refined control over particular aspects of the deployment while leaving other aspects of the deployment generic to definitions of the base classes.

FIG. 3B shows some base class definitions that are stored (e.g., in a "lamp" module 320) and reused in configuration specifications of multiple cloud-based deployments. These base class definitions are tailored for various Linux Apache MySQL Perl/Python (LAMP)-based application deployments. Each class definition includes some commonly used class parameters for configuring a respective data or functional component of a LAMP-based application deployment.

FIG. 3C provides an example configuration specification 340 that utilizes the base classes in the "lamp" module 320 to deploy a Mantis debugging software in a LAMP-based application deployment. By utilizing the based class definitions in the "lamp" module 320, the configuration specification 340 for the Mantis application deployment does not need to include the details of how a basic LAMP-based environment is configured, and only needs to customize aspects that are particular to the Mantis application deployment.

The following describes how the based class definitions in the "lamp" module 320 are used to establish a basic LAMP deployment structure. In the "lamp" module 320, the special "Params" class 322 includes some parameters that are used in multiple class definitions, such as a flag "single_node" indicating whether the Apache software and the MySQL software should be installed on the same virtual machine, a "frontend_ip" parameter for specifying the IP addresses to be bound to the LAMP frontend component, a "serving domain" parameter for specifying the domain name of the Apache website, a "doc_root" parameter for setting the document root of the Apache server, a "mysqldatafolder" parameter for setting the database folder relative to the persistent disk mount point, a "mysql_pdname" parameter for specifying the name of the persistent disk, a "mysql_pd_mount_point" parameter for specifying the mount point of the persistent disk, a "pd_size_gb" parameter for specifying the size of the persistent disk in GB. Optionally, the parameter values in the special "Params" class can be changed through a command line tool provided by the cloud-service provider to make it more convenient for users to adjust deployments based on the "lamp" module.

A LAMP-based application deployment typically includes the following components: a frontend (i.e., the software role of a frontend software application), virtual machines on which the frontend software application (e.g., an Apache web server application) is installed, a database (i.e., the software role of a database software application), virtual machines on which the database software application (e.g., a MySQL software application) is installed, a permanent disk for storing the database, and a firewall. Each of the above components is modeled by a respective set of class parameters that are configurable for a particular LAMP-based application deployment.

As shown in FIG. 3B, the class definition "FrontendVM" 324 extends from an existing class definition "utils.ConfiguratorLAMP" which configures a virtual machine image that already has an Apache web server software pre-installed. In this case, the MySQL database software is to be installed on the same virtual machine as the Apache software, as indicated by the "single_node" flag in the "Params" class definition 322. Therefore, the "DatabaseVM" class definition 326 also extends from the class definition "utils.ConfiguratorLAMP."

In the "lamp" module 320, the "MysqlPD" class definition 328 models the permanent disk on which the database is to be stored. The MysqlPD class definition 328 includes class parameters that specify the name of the persistent disk, the size of the persistent disk, and the mount point of the persistent disk, for example. Other parameters that specify how the persistent disk should be configured are inherited from an existing "std.PersistentDiskSpec" class definition without modification.

The "FrontendRole" class definition 330 models the frontend component of the LAMP-based environment. The "FrontendRole" class definition 330 extends from a standard software role modeled by an existing base class definition "std.Role." The "FrontendRole" also refers to a "lampfront" placeholder class and a "lamp" placeholder module as the temporary values assigned to the "roleName" and the "moduleName" class parameters. These temporary values will be replaced by the names of the actual module and class that configure the LAMP frontend software application to be deployed. As will be shown in FIG. 3C, the class definition that configures the front end software (e.g., the Mantis debugging software) is the "mantis_frontend" class in the "mantis" module. The class definition 330 also sets forth that the virtual machine on which the LAMP frontend role is to be installed is represented by an instance of the "FrontVM" class 324.

The "DatabaseRole" class definition 332 models the database component of the LAMP-based environment. The "DatabaseRole" class also refers to a placeholder class in a placeholder module (e.g., "lamp" and "lamp_backend") for the backend software configuration. The names of the placeholder class and the placeholder module will be replaced by the actual names of the class and module that configure the backend database software. The "DatabaseRole" class definition 332 also specifies that the persistent disk storing the database is represented by an instance of the "MysqlPD" class definition 328. In addition, a "vms" parameter is defined to indicate that the virtual machine for installing the backend database software of the LAMP environment is to be represented by an instance of the "FrontendVM" class if the "single_node" flag is set to TRUE, otherwise, the virtual machine is to be represented by an instance of the "DatabaseVM" class.

Lastly, in the "lamp" module 320, the firewall component of the LAMP-based environment is modeled by the "HttpFirewall" class definition 334. The "HttpFirewall" class definition extends from the existing "utils.PublicTCPFirewall" class definition, such as the protocol, source, and target parameters of the "util.PublicTCPFirewall" class are inherited by the "HttpFirewall" class. The "HTTPFirewall" class definition modifies the "port" parameter of the "utils.PublicTCPFirewall" from "any" to "80."

Each class definition set forth in the "lamp" module 320 shown in FIG. 2B is extendable, modifiable, and/or usable as is for an application-specific deployment and/or for creating new class definitions in other modules. The configuration specification 340 shown in FIG. 3C includes and builds upon the class definitions in the "lamp" module 320 shown in FIG. 3B. A statement 342 at the beginning of the configuration specification 340 points to a file containing the class definitions of the "lamp" module 320, to indicate to the compiler where to locate the base class definitions that are used in the configuration specification 340.

The configuration specification 340 is for configuring an application deployment that launches virtual machines in a LAMP structure and installs the Mantis debugging software on the virtual machines. Mantis is a web-based bug-tracking system written in the PHP scripting language and works with a MySQL database and a webserver.

As specified in the in the "MantisDeployment" class definition 354, the deployment calls for two software roles and a firewall to be installed. In this case, the two software roles are created according to the "MantisFrontend" class definition 348 and the "MantisDatabaseRole" class definition 350, while the firewall is created according to the "MantisFirewall" class definition 352. When the configuration specification 340 is compiled, the statement 356 makes an instance of the "MantisDeployment" class and causes the other classes on which the "MantisDeployment" class depends to be instantiated as well.

In this example, the "MantisFrontend" class definition 348 extends from the "lamp.FrontendRole" class definition 330 shown in FIG. 2B. The class parameters that are modified for the Mantis software installation include the "roleName," "moduleName" of the software configuration specification, the "dataPackages" from which the Mantis software binaries can be copied, and the database host to be associated with the Mantis application deployment. The configuration parameters for the virtual machine aspect of the Mantis frontend are inherited from the "lamp.FrontendRole" class definition 332 without modifications. In other words, the user writing the configuration specification 340 accepts the default virtual machine configuration specified in the "lamp" module 320, and needs not customize the Mantis application deployment with that level of details.

Similarly, the "MantisDatabaseRole" class definition 350 extends from the "lamp.DatabaseRole" class definition 332 shown in FIG. 3B. The class parameters that are modified for the Mantis software installation includes the "roleName" and "moduleName" of the configuration specification for the backend database role. In addition, the frontend host of the database role is set to be an instance of the "MantisFrontendRole" class. The configurations for the virtual machine aspect and the persistent disk aspect of the database backend role are inherited from the "lamp.DatabaseRole" class definition 332 without modification.

In addition, the "MantisFirewall" class definition 352 inherits the parameters from the "lamp.HTTpFirewall" and modifies only the value for the "target" parameter to an instance of the "MantisFrontendRole" class. Other parameters, such as the "port" and "protocol" parameters of the "MantisFirewall" class are inherited from the base class "lamp.HTTpFirewall" defined in the "lamp" module 320.

Other parameters and values specific to the Mantis deployment are set forth in the special "Params" class definition 344 and the data package from which the Mantis software is copied is specified in the "MantisPackage" class definition 346.

In the above example, the configuration specification for the Mantis software deployment is derived from the base class definitions (e.g., class definitions in the "lamp" module 320) created for a generic LAMP-based application deployment. Configurations of many aspects of the LAMP-based deployment do not have to be redefined for the Mantis application deployment. The configuration specification for the Mantis application deployment only needs to specify new parameters or new parameter values that are particular to the Mantis application deployment or in need of customization. Parameters that are already defined for other more generic aspects of the deployment do not need to be re-specified or modified in the configuration specification 340. The details of these other aspects of the deployment can remain opaque to the user.

The examples shown in FIGS. 3A-3C are merely illustrative of the properties of an object-oriented specification language for writing configuration specifications of cloud-based deployments. In various implementations, the exact syntax of the object-oriented specification language can depart from what is shown in the examples. Furthermore, many types of base classes can be created to model the components that may exist in a cloud environment. Syntax for specifying relationships between components modeled by the classes can also vary from one object-oriented specification language to another object-oriented specification language. For a given object-oriented specification language, a compiler can be created to parse the class definitions included in a configuration specification written in the object-oriented specification language according to a predetermined set of syntax rules to extract the parameters that are used to configure the various types of components in the cloud environment.

Figure 4:
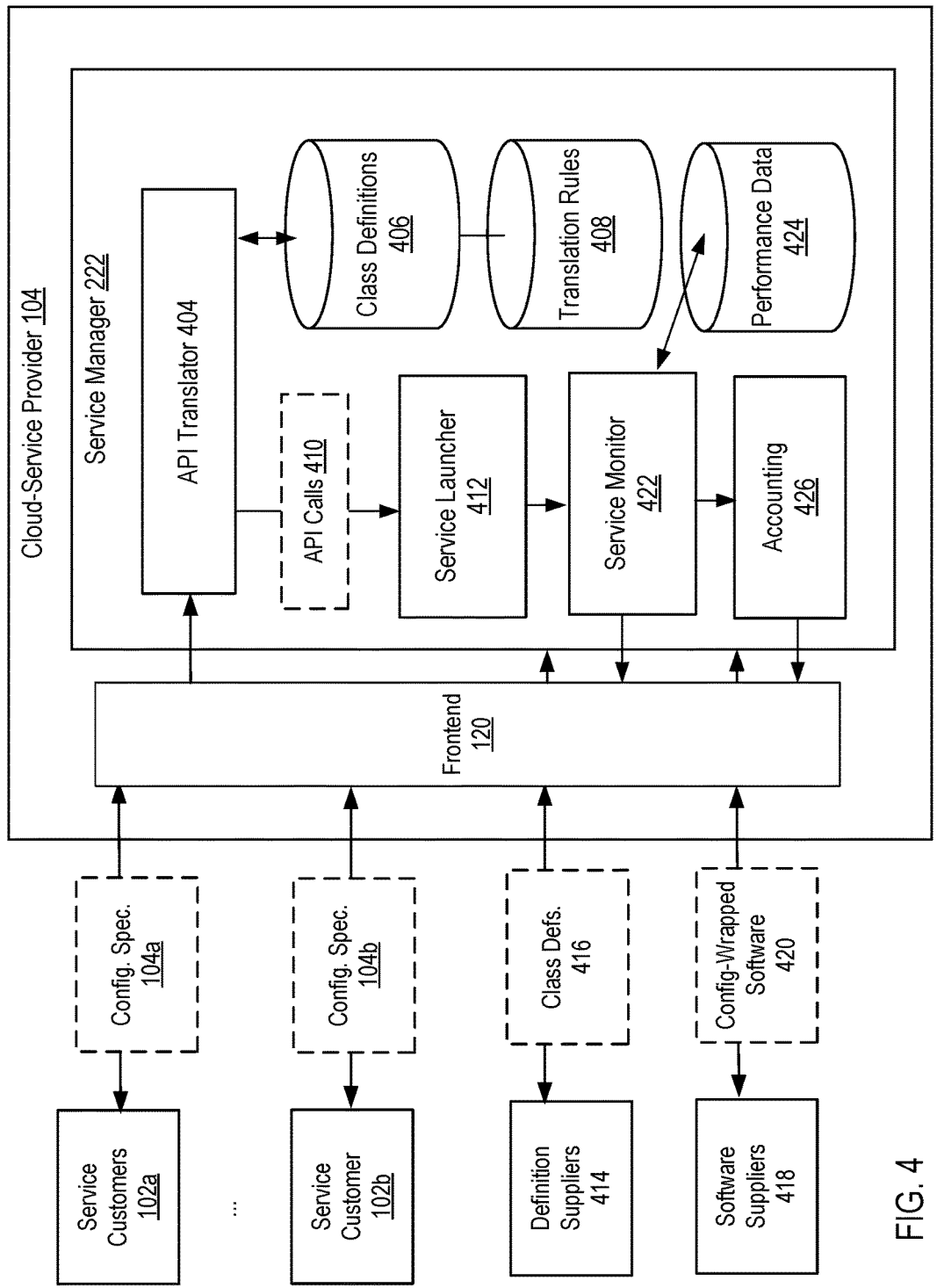
FIG. 4 is a block diagram of an example cloud-service manager of an example cloud-service provider.

FIG. 4 shows an example cloud-service manager 222 of an example cloud service provider 104. The example cloud-service manager 222 is responsible for deploying cloud-based services according to the configuration specification 104 provided by the administrative users (e.g., 102a, 102b, 102c) of the services. The cloud-service manager 222 receives communications from the administrative users of the cloud-customers through the frontend 120 of the cloud-service provider 104. In some implementations, the cloud-service manager 222 may have its own frontend components that communicate with the cloud-service customers directly.

After the frontend 120 receives the configuration specifications 104 from an administrative user of the cloud-service customers, the frontend 120 passes the received configuration specifications 104 to an API translator 404 of the cloud-service manager 222. The API translator 404 have access to a library of core class definitions (e.g., stored in a definition database 406) and translation protocols (e.g., stored in a rule database 408) on how to translate the core class definitions into respective sets of API calls for configuring various components of a cloud-based environment of the cloud-service provider 104.

For example, the API translator 404 can include a compiler (e.g., a parsing script or program) that parses the class definitions received in a configuration specification 104, identify all the base classes from which the classes in the configuration specification are derived, and extract the base class parameters that are left unmodified as well as the class parameters that are modified or new. In addition, the compiler also identifies all the relationships (e.g., connectivity and dependencies) among the components of the cloud-based deployment from the statements in the class definitions. Based on the values of the class parameters and the stored translation protocols, the API translator 404 generates an appropriate set of API calls 410 to configure various aspects of the cloud-based deployment.

For example, the translation protocols can include a mapping between a core class definition modeling a respective modular aspect of the cloud-based environment to a group of API calls that are used to configure that aspect of the cloud-based environment. The translation protocols can further include protocols for modifying the set of API calls (e.g., changing default parameters used in the API calls) with parameter values specified for that modular aspect of the cloud-based environment in classes derived from the core class definition.

As a more specific example, suppose a standard virtual machine class definition (e.g., a "std.VM" class) is a core class definition known to the compiler. The compiler would have access to a translation rule mapping the core class definition to a set of provisioning API calls made to the VM manager in the kernel layer of the cloud-service provider 104 for deploying a standard virtual machine image. A default set of parameters (e.g., duplicate count, IP address, memory requirement, etc.) can be used in the provisioning API calls. The protocol for modifying the API calls can include protocols for changing the default parameter values according to the parameter values specified in the specification configuration and in intermediate class definitions that are derived from the standard virtual machine class definition. For example, if a class parameter of a new class definition derived from the standard virtual machine image specifies the software package to be installed on the virtual machine image, the translation protocols would specify how the additional API calls for installing software packages on a designated virtual machine should be added to the group of API calls associated with configuring the standard virtual machine image.

In some implementations, the protocols for translating class definitions to API calls are written as program scripts. As new core class definitions are added to the class definition database 406, the protocol for translating the new class definition can be created and added to the translation rules database 408. The translation protocols can be created, for example, by the cloud-service provider 104. In some implementations, when encountering a particular class definition in parsing a received configuration specification, the API translator 404 locates and runs a corresponding script to parse the class definition into a set of API calls. The API calls, when executed, cause the configuration specified by the class definition to be achieved in the cloud-based environment.

In some implementations, the API calls 410 generated by the API translator 404 are sent to a service launcher component 412 of the cloud-service manager 222. The service launcher component 412 is responsible for channeling the API calls 410 to various layers of the cloud-service environment or components of the cloud-service provider 104 where the API calls can be executed. In some implementations, where the deployment are to be carried out in several stages due to the dependencies between various aspects of the deployment, the service launcher component 412 is also responsible in checking the order by which the API calls are sent out to the layers and/or components for execution, and verify that the API calls have been completed in a proper sequence.

Since class definitions written in an object-oriented specification language as disclosed in this specification can be reused in multiple configuration specifications, an administrator user of a cloud service may wish to employ class definitions provided by a third party (e.g., another user, a service developer of the cloud-service provider, or third-party developers) in their own configuration specifications, rather than developing those class definitions by themselves. In some implementations, a marketplace for sharing/sale and selection of existing configuration specifications and reusable class definitions can be provided, for example, by the cloud-service provider or a third-party provider.

In this example, the cloud-service provider 104 provides such a platform for the sharing of reusable configuration specification and class definitions. In some implementations, the frontend of the cloud-service provider provides a definition submission user interface and a definition selection interface to facilitate the sharing of reusable configuration specifications and class definitions. The parties that provide the configuration specifications and class definitions for reuse by others serve as definition suppliers 414 for the cloud-service provider 104. The potential definition users include administrative users of cloud-based services. The potential definition users also, optionally, include definition suppliers who will create new reusable class definitions or class definitions for submission based on the existing class definitions provided by other definition suppliers.

As shown in FIG. 4, the cloud-service manager 222 of the cloud-service provider 104, or a component of the cloud-service manager 222, can serve to manage the platform for sharing reusable class definitions 416. The definition suppliers 414 submit reusable class definitions 416 to the cloud-service manager 222 through the definition submission user interface provided by the frontend 120. Each class definition submission can include multiple reusable class definitions 416, such as in a class module. Each class definition in the submission is accompanied by descriptions of the initial configuration state that the class definition can accomplish if subsequently used in a configuration specification. In some implementations, the description also includes instructions on how the class parameters in the class definition can be subsequently modified in configuration specifications to suit the needs of particular deployments.

When a definition supplier submits a reusable class definition or a module of reusable class definitions, the cloud-service manager 222 can store the received class definitions in a class definition database (e.g., the definition database 406). In some implementations, the frontend 120 provides registration and authentication services for the definition suppliers 414. Each class definition or class module received from a registered definition supplier 414 is stored in association with the identifier of the definition supplier, such that the definition supplier 414 can be properly credited when the class definition is subsequently used or purchased by a definition user.

In some implementations, the definition suppliers 414 can provide reusable class definitions 416 for free or for a cost. The cloud-service manager 222 can facilitate the sale or license of the reusable class definitions to the potential definition users (e.g., administrative users of the cloud-service customers) through the definition sharing platform. In some implementations, the definition supplier 414 provides and the cloud-service manager stores respective prices associated with the sale or licenses for different usage levels for the reusable class definitions provided by the definition suppliers 414.

In some implementations, the cloud-service manager 222 provides a definition selection user interface over the frontend 120. The definition selection user interface presents the class definitions that are available for reuse, such as in defining new class definitions. The new class definitions include those included in the configuration specification of a new deployment and, optionally, those that are submitted to the cloud-service provider for reuse by others. The potential definition users (e.g., administrative users of the cloud-service customers and definition suppliers) can view the class definitions that are available for selection through the definition selection interface, along with their prices and descriptions, and optionally, reviews and quality scores, and decides on whether to reuse one or more of the class definitions in a configuration specification or for deriving a new class definition.

In some implementations, potential definition users provide the definition selection user interface with criteria that specify a configuration to be deployed. The criteria can include one or more class definitions. The cloud-service manager 222 processes the criteria and provides, to the user, collections of class definitions satisfying the criteria. A collection of class definitions can include additional class definitions that are not explicitly specified in the criteria as long as the additional class definitions are compatible with class definitions specified in the criteria. The collections of class definitions can be ranked using methods further described below in FIGS. 16, 17, and 20. If the user selects a collection of class definitions, the cloud-service manager 222 identifies a configuration specification associated with the collection of class definitions and deploys the configuration specification to the cloud environment of the cloud-service provider 104.

In some implementations, definition selection user interface allows the user of the class definitions to download or copy a reusable class definition available for selection. In some implementations, the user does not have to copy or download the class definition, and can use the class definitions by simply identifying the module and class name in a configuration specification submitted to the cloud-service provider for deployment. The cloud-service manager 222 will identify and locate the class definitions that are referenced in the specification file, and keep track of the usage of the class definition.

In some implementations, the reuse involves an entire module (e.g., the "lamp" module shown in FIG. 3B), where the module includes a collection of multiple interrelated class definitions for configuring a cloud component that includes multiple sub-components. In some implementations, the class definitions or class modules are categorized based on the type of components they model. In some implementations, the definition selection interface allows the potential users of the class definitions to search or review available class definitions by categories, functions, definition suppliers, and other attributes associated with the class definitions and modules.

In some implementations, the cloud-service provider 104 or a third party provider also provides a platform for software suppliers 418 to provide software solutions accompanied by multiple alternative configuration specifications or alternative collections of class definitions for configuring the software solutions. For example, a personnel management program can be accompanied by configuration specifications that are tailored for cloud-service customers that have different scale, needs, and internal infrastructures. When a cloud-service customer purchases or licenses the software solution for deployment in the cloud environment of the cloud-service provider 104, the cloud-service customer can choose the configuration specification that best suits its needs.

In some implementations, the service manager 222 can receive submissions of software solutions with accompanying configuration specifications (e.g., either as configuration specifications or modules of reusable class definitions) through a software submission user interface provided through the frontend 120. In some implementations, the software submission user interface includes registration and authentication capabilities, such that each submission of a configuration-wrapped software solution 420 is stored in association with the software provider that submitted the configuration-wrapped software solution 420.

The cloud-service provider 104 can provide the configuration-wrapped software solutions in a software selection interface to the cloud-service customers through the frontend 120. The software selection interface can also provide the descriptions of the different configuration specifications accompanying each software solution. When a user (e.g., an administrative user of an cloud-based application service) select a software solution and one of the accompanying configuration specifications from the software selection interface, the cloud service provider 104 can launch the software solution in the cloud-based environment according to the selected configuration specification, with or without additional customizations.

In some implementations, the cloud-service provider 104 facilitates the accounting (e.g., by an accounting component 426) for the sale and purchase of the reusable configuration specifications, reusable class definitions, and configuration-wrapped software solutions that are accomplished through the platforms provided by the cloud-service provider 104. In some implementations, the cloud-service provider does not need to directly provide these platforms, but provide accounting services (e.g., by the accounting component 426) to the user and provider of the reusable configuration specifications, reusable class definitions, and configuration-wrapped software solutions based on actual usage that has occurred in the cloud environment of the cloud-service provider 104.

In some implementations, the cloud-service manager 222 includes a service monitor 422. The service monitor 422 monitors the statuses of the cloud-services that have been deployed in the cloud environment of the cloud-service provider 104. The statuses monitored by the service monitor 422 include, for example, the virtual resources that are employed for each component of a cloud-based deployment, the usage level of the virtual resources, the cloud-services that are employed by each component of the cloud-based deployment, the usage level of the cloud-services. The service monitor 422 can compute performance metrics associated with each cloud-based deployment based on the statuses of the virtual resources and the cloud-based services that are associated with the deployment. The performance metrics include, for example, the number of user requests received, the latency associated with the responses, the availability of the virtual resources and services, the failure rate of each virtual resource or service, the fault tolerance level of the virtual resources and services, and so on. In some implementations, the performance metrics is stored in a performance data store 424 of the cloud-service manager 222.

As disclosed in this specification, cloud-based deployments can be carried out according to configuration specifications written in an object-oriented specification language, where the configuration specifications include class definitions that model different aspects of the cloud-based deployments at different levels of abstraction. When the cloud-service manager 222 processes a configuration specification into a set of class definitions, the cloud-service manager 222 is able to track the hierarchy of class definitions that have influenced the configuration of each of those different aspects of the deployment. Further, the cloud-service provider is able to associate the virtual resources and services that are dedicated to the different aspects of the cloud-based deployment to the different class hierarchies that have influenced the configuration of those aspects of the cloud-based deployment.

Therefore, the object-oriented specification language allows performance metrics to be derived for each of these different aspects based on the status and performance of the virtual resources and services that contribute to the performance of the aspect of the cloud-based deployment. In particular, the performance associated with each aspect of the cloud-based deployment is associated with the class definitions that are involved in configuring that aspect of the cloud-based deployment. Then, the performance associated with a class definition can be used as a factor in determining a quality measure for the class definition. If a class definition is used in configuring multiple cloud-based deployments, the aggregated performance associated with the class definition can be used to assess the quality of the class definition.

Using the reusable class definitions and configuration specification shown in FIGS. 3B and 3C as an example, when the service-cloud manager 222 deploys the Mantis and MySQL software applications and the firewall service in the Mantis application deployment according the "MantisDeployment" class definition 354 and all the base classes on which the "MantisDeployment" class definition 354 depends, the service manager 222 can monitor the respective performances of the software roles, the firewall service, and the underlying virtual machines supporting the software roles. The cloud-service manager 222 can associate the respective performances of the frontend role with the classes that influenced the configuration of the frontend component of the Mantis deployment, associate the respective performance of the firewall component with the classes that influenced the configuration of the firewall component, associate the respective performance of the virtual machines underlying the frontend role with the classes that influenced the configuration of the frontend virtual machines, and so on, for example.

In some implementations, the cloud-service manager 222 can generate a system block diagram of the cloud-based deployment according to the configuration specification writing in the object-oriented specification language. For example, the nature of the infrastructural components, storage, services, software roles, as well as their interrelationships (e.g., dependencies and connectivity) and reconfiguration triggers, can be identified from the class definitions in the configuration specification and represented as corresponding elements in the system block diagram of the deployment. The basic system block diagram can be created when the configuration specification is parsed by the API translator 404, for example.

Figure 5:
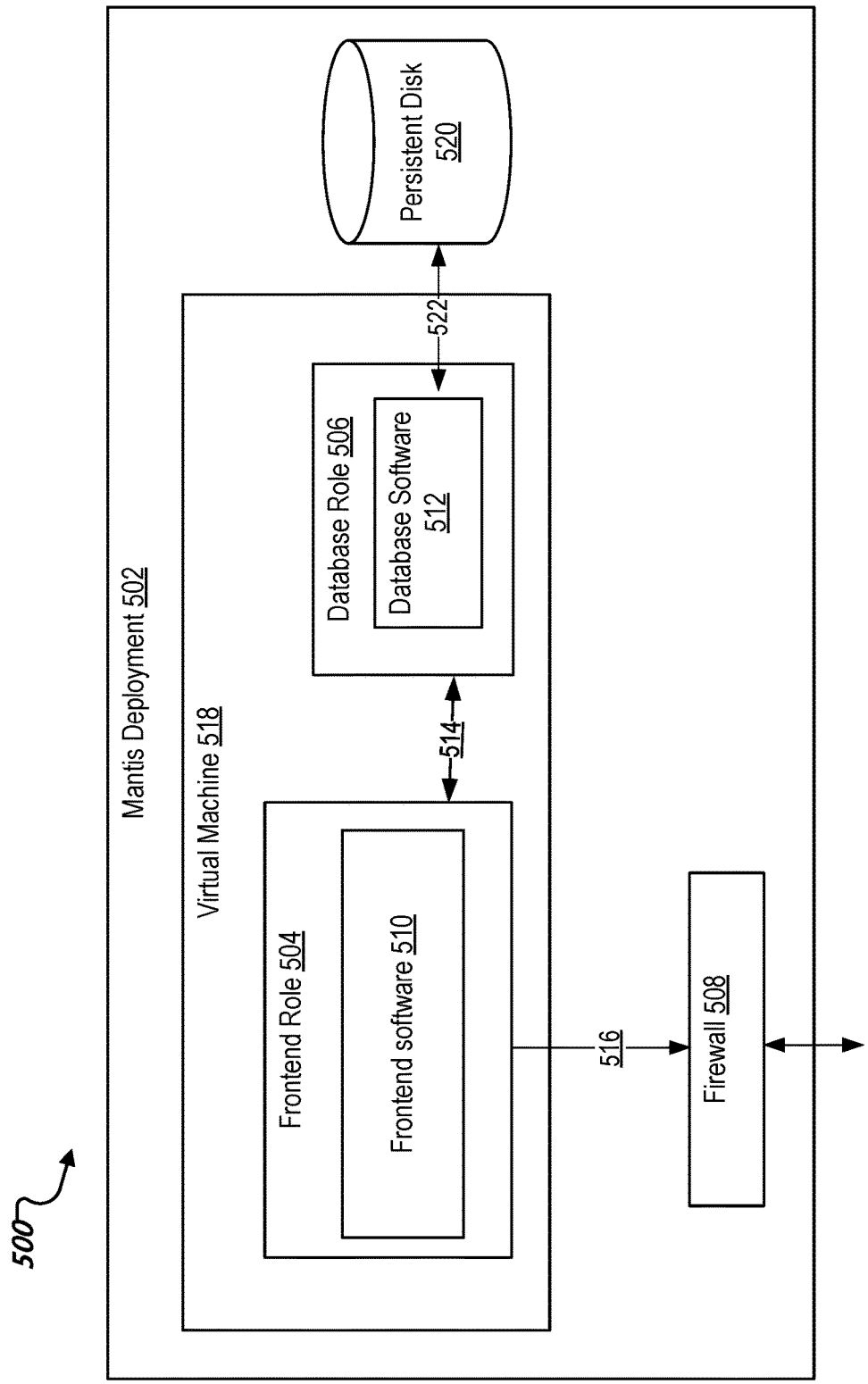
FIG. 5 is a block diagram showing a topology of an example cloud-based deployment configured according to the configuration specification shown in FIG. 3C.

FIG. 5 shows the block diagram 500 that can be created based on the deployment specification 340 shown in FIG. 3C. When parsing the configuration specification 340 of the Mantis application deployment, the cloud-service manager 222 recognizes from the "MantisDeployment" class definition 354 that there are two software roles and a firewall involved in the deployment, e.g., the software roles modeled by the "MantisFrontendRole" and the "MantisDatabaseRole" class definitions and a firewall modeled by the "MatisFirewall" class definition. Therefore, the cloud-service manager 222 can add a block 504 for the frontend role, a block 506 for the database role, as well as a block 508 for the firewall service within a block 502 representing the Mantis application deployment.

Next, according to the class definition of the "MantisFrontendRole" class, the cloud-service manager 222 determines that the software application serving the frontend role is to be deployed according to the class definition of the "mantis_frontend" class. The cloud-service manager 222 therefore adds a block 510 within the block 504, to represent the frontend software that is serving the frontend role. Similarly, from the class definition of the "MantisDatabaseRole" class, the service manager 222 determines that the software application serving the database role is to be deployed according to the class definition of the the "mantis_backend" class. Therefore, the service manager adds a block 512 within the block 506, to represent the backend database software that is serving the database role.

Furthermore, according to the class definitions 348 and 350 of the "MantisFrontendRole" and the "MantisDatabaseRole," the frontend role and the database role are connected to each other. Based on the class definition 352 of the "MantisFirewall," the firewall is connected to the frontend role. Therefore, the cloud-service manager 222 can insert a connection 514 between the block 504 and the block 506, to represent the connectivity relationship between the frontend role and the database role. In addition, the cloud-service manager 222 also inserts a connection 516 between the block 504 and the block 508, to represent the connectivity relationship between the frontend role and the firewall.

In addition, since the "MantisFrontRole" class definition 348 extends from the "FrontendRole" class definition 330, the cloud-service manager 222 determines from the class definition 330 of the "FrontendRole" class that, the frontend software (e.g., the Mantis software) is to be installed on a virtual machine modeled by the "FrontendVM" class definition 324. Similarly, the "MantisDatabaseRole" class definition 350 extends from the "DatabaseRole" class definition 332, and the cloud-service manager 222 determines from the class definition 332 of the "DataBaseRole" class that, the backend database software (e.g., the MySQL database software) is to be installed on the same virtual machine as the frontend role software. Based on the above information, the service manager 222 adds a block 518 under the blocks 504 and 506, to represent the underlying virtual machine for the frontend role and the database role.

Furthermore, according to the "DatabaseRole" class definition 332, the cloud-service manager 222 determines that a persistent disk is connected to the database role by a mount point on the underlying virtual machine. The persistent disk is deployed according to the specification specified in the "MysqlPD" class definition 328. Therefore, the service manager 222 adds a block 520 to the block 502 representing the mantis deployment, and adds a connection 522 to represent the connectivity relationship between the database software, its underlying virtual machine, and the permanent disk.

In some implementations, when the components of the deployment is deployed, the service manager 222 can also record identifiers associated with the underlying infrastructure components (e.g., process IDs or identifiers of the virtual machines and other virtual resources) for each block or connection represented in the block diagram 500. When the cloud-service manager 222 monitors the statuses of the underlying virtual resources and services for the deployment, the cloud-service manager 222 optionally determines the performance or usage metrics for each component (e.g., blocks and connections) represented in the block diagram 500. The cloud-service manager 222 can also optionally represent the performances and usage of the different component in the system block diagram 500.

In some implementations, visualization of the performances and usage of these different components of the deployment and their changes over time can be shown on the block diagram 500. In some implementations, the cloud-service manager 222 can present the performance and usage statistics in a visual form on the block diagram in a management interface of the cloud services for each cloud-service user. For example, the performance and usage statistics can be represented as a histogram or pie chart that dynamically changes according to the actual conditions of the components in the cloud environment. In some implementations, the cloud-service provider bills the cloud-service customers according to the performance and usage statistics.

In some implementations, the configuration specification optionally includes programmatically triggered reconfiguration requests. For example, the configuration specification for a component can specified that when a particular monitored parameter reaches a specified threshold value, the cloud-service manager 222 is to scale the provisioned virtual machine or services by a specified amount. For a more specific example, the class definition of the persistent disk class (e.g., the "MysqlPD" class definition) can include a statement that requests an increase in the size of the persistent disk when the disk capacity is 80% utilized; the class definition of the "frontendVM" class can request that when the latency of the frontend role is more than one second, the "replica-count" parameter of the FrontendVM is to be increased by one; and so on.

As set forth in this specification, the object-oriented specification language allows the configuration of each component in a cloud-based deployment to be specified by a respective set of class definitions. When parsing a configuration specification, the service manager is able to identify the components of the deployment, and identify all of the base classes whose class parameters contributed to or influenced the configuration state of the component. In some implementations, the performance of each component is associated with the class definitions that contributed to the configuration of that component. If a class definition contributed to the configuration of multiple components in multiple deployments, the performance of these multiple components in the multiple deployments can all be associated with that class definition. The quality of the class definition can be assessed based at least in part on the aggregated performance of all of the multiple components in the multiple deployments.

In some implementations, the cloud-service manager keeps track of the usage of each class definition in the cloud-based environment and charges the cloud-service users that have used the class definition in their deployments. Optionally, the amount of charge billed to the users is based on the amount of usage the user has accrued for the class definition in all of the deployments the user has requested. In some implementations, where the class definitions are provided by third-party definition providers, the cloud-service manager 222 can record a credit to the third-party definition provider for each use of the class definition provided by the third-party definition provider.

For example, when parsing the configuration specification for the Mantis application deployment shown in FIG. 3C, the cloud-service manager 222 records that the Mantis frontend component 504 is deployed according to the "MantisFrontendRole" class definition 348, which extends the "lamp.FrontendRole" class definition 330, uses the "mantis_frontend" class definition for software configuration, and the "MantisPackage" class definition 346 to identify the location of the software package, and is connected to the "MantisDatabaseRole" class 350. Further, the service manager 222 determines that the "lamp.FrontendRole" class definition 330 further extends from the "std.Role" class definition, uses the "FrontendVM" class definition 324, and that the "FrontendVM" class definition 324 extends from the "utils.ConfiguratorLAMP" class definition.

The cloud-service manager 222 can continue to identify the class definitions that are involved in the configuration of the frontend role component of the deployment by tracing the class hierarchies connected to the "MantisFrontendRole" class definition 348, until the most fundamental sets of class definitions are identified. All of the class definitions that contributed to the configuration of the frontend role component are associated with the frontend role component for the deployment. A similar process can be carried out for each component of the deployment.

When the deployment is carried out, the cloud-service manager 222 can record the usage of each class definition in configuring the deployment according to the number of times that the class definition is used in the deployment. In some implementations, multiple uses of a class definition is counted only once in each deployment or for each user, depending on the payment structure (e.g., fees per use license or per sale) established by the definition supplier of the class definition.

In some implementations, in a marketplace of reusable class definitions, each reused class definition can be ranked against other reused class definitions according to the aggregate performance of the class definition in all the deployments that used the class definition. In some implementations, the performance of a deployment can be associated with each class definition that contributed to the configuration of the deployment, and used in evaluating the quality of the class definition. In some implementations, only performances of those components whose configurations are influenced by a class definition are associated with the class definition and used in evaluating the quality of the class definition.

For example, when the cloud-service manager identified multiple components in multiple deployments that are influenced by a virtual machine class definition, the aggregated performance of the multiple components are used in evaluating the quality of the virtual machine class definition. In addition, when the cloud-service manager identifies all of the class definitions that contributed to the configuration of a frontend role component of a deployment, the performance associated with the frontend role component in the deployment will be associated with each of these identified class definitions.

In some implementations, a quality score is calculated for each class definition based on the aggregated performance associated with all or multiple components or deployments that are configured based at least in part on the class definition. The quality score can be presented with the class definition in the definition selection interface provided by the cloud-service provider. In some implementations, multiple quality metrics can be calculated for each class definition based on, for example, the scales of the deployments that utilized the class definition, the weight or influence of the class definition in each deployment that utilized the class definition, the availability, fault tolerance, scalability, and failure rate of the components configured according to the class definition, the types of problems encountered, the modifications required to solve the encountered problems, explicit user feedback, and so on. Based on the various quality metrics, one or more types of quality scores can be provided for each shared class definition and a potential definition user can browse the list of available shared class definitions based on the quality scores.

Although the above example describes the quality scores with respect to reusable class definitions, similar quality scores can be calculated for reusable class modules, reusable configuration specifications, or configuration-wrapped software solutions.

Figure 6:
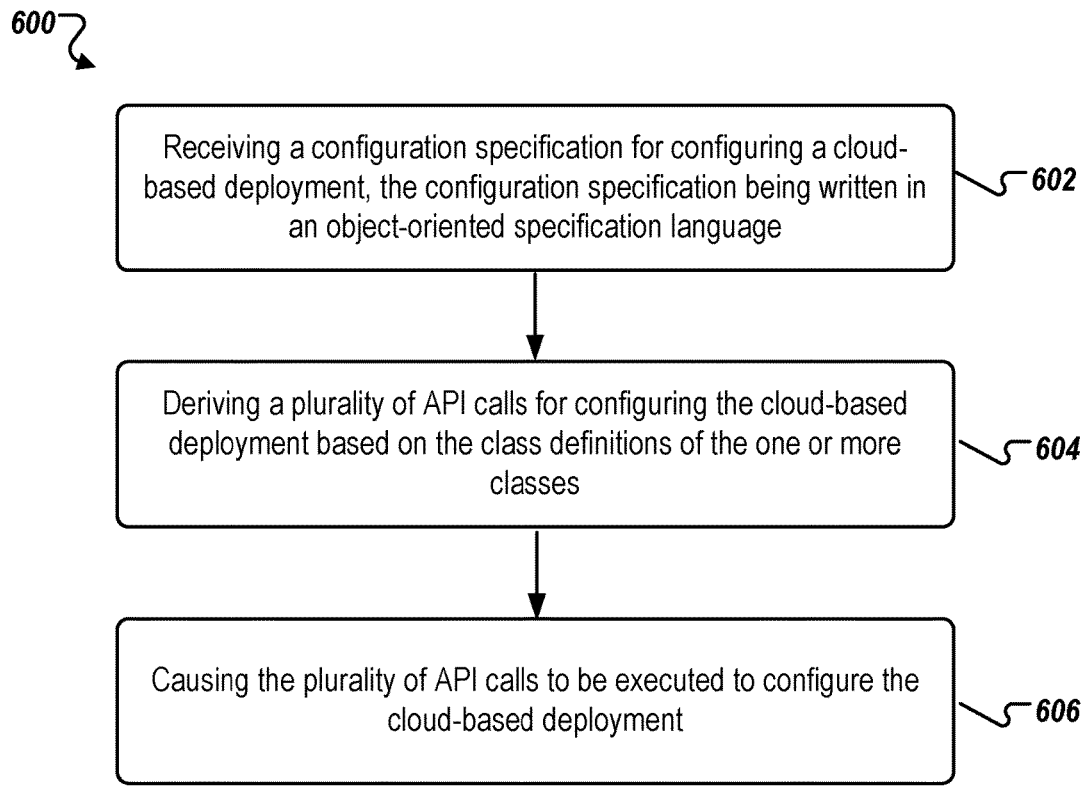
FIG. 6 is a flow diagram of an example process for processing a configuration specification written in an object-oriented specification language.

FIG. 6 is a flow diagram of an example process 600 for processing a configuration specification written in an object-oriented specification language. An example of such a high-level object-oriented specification language is described in the examples shown in FIGS. 3A-3C. The example process 600 can be performed by a cloud-service provider (e.g., the cloud-service provider 104 shown in FIG. 1), such as by a cloud-service manager (e.g., the cloud-service manager 222) of the cloud-service provider. In some implementations, the cloud-service manager performs the process 600 by an API translator component (e.g., the API translator 404 in FIG. 4).

In the example process 600, a configuration specification for configuring a cloud-based deployment is received (e.g., by the API translator of a cloud-service provider) (602). The configuration specification is written in an object-oriented specification language and requires instantiation of class definitions of one or more classes. Each class models a respective data or functional component of the cloud-based deployment using a group of configurable class parameters. The respective class definition of each class represents a requested state of the data or functional component modeled by the class. A plurality of API calls for configuring the cloud-based deployment are derived based on the class definitions of the one or more classes (604). Then, the API translator of the cloud-service provider causes the plurality of API calls to be executed to configure the cloud-based deployment (606).

In some implementations, the one or more classes include at least an existing base class and at least a customized class extended from the existing base class. In some implementations, the customized class inherits respective class parameters of the existing base class and modifies a value of at least one of the class parameters inherited from the existing base class. In addition, or alternatively, the customized class inherits respective class parameters of the existing base class and includes at least one new class parameter not present in the existing base class.

In some implementations, a modification of a base class propagates to deployments of configuration specifications that include the base class or classes that inherit the base class. The cloud-service provider can modify a base class. Once the base class is modified, the cloud-service provider propagates the modification to deployments having configuration specifications that include the base class or a class inheriting the base class. In some implementations, the propagation can trigger a redeployment for each configuration specification having a modified base class. For example, if a more improved solution is discovered for executing a functional component (e.g., a faster method of running a web server is discovered), the cloud-service provider can modify the base class for the functional component to implement the improved solution. The cloud-service provider identifies configuration specifications that include the base class or classes that inherit the base class. The cloud-service provider then redeploys these configuration specifications with the improved solution.

In some implementations, the data or functional component modeled by each class is one of a virtual device supporting a cloud-based environment, a service utilized in the cloud-based environment, a software role performed by an installed application in the cloud-based environment, a data package holding data to be used during deployment or operation of the cloud-based environment, or a combination of one or more thereof.

In some implementations, the object-oriented specification language supports dependency between class definitions, and a definition dependency between a first class and a second class represents a deployment dependency between respective components modeled by the first and the second class. In some implementations, the definition dependency between the first class and the second class is expressed by a class parameter of the first class where the class parameter of the first class refers to an instance of the second class.

In some implementations, the object-oriented specification language supports connectivity between class definitions, and a value assignment linking an instance of a second class to a class parameter of a first class represents a connectivity between respective components modeled by the first class and the second class.

Figure 7:
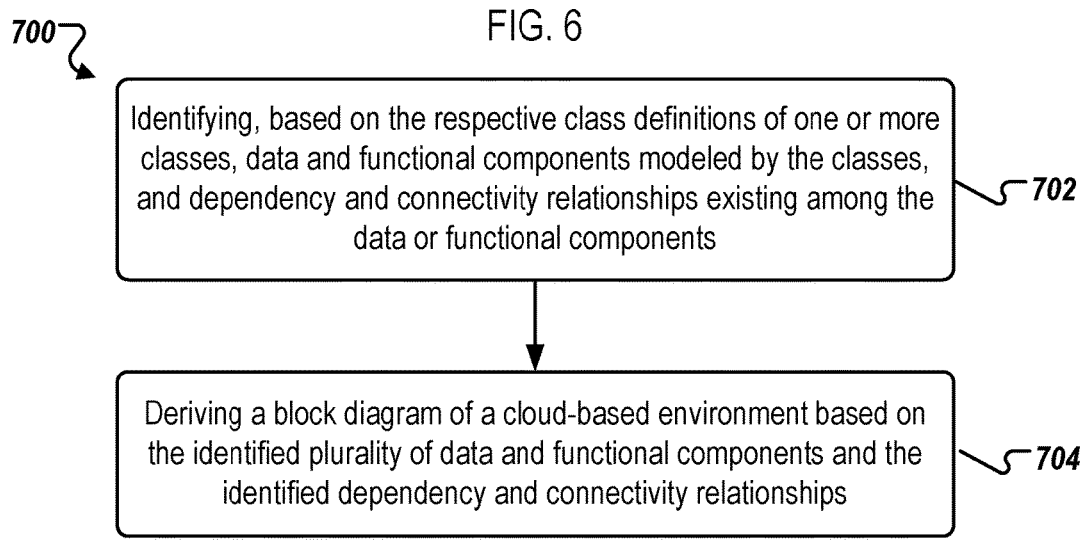
FIG. 7 is a flow diagram of an example process for deriving a block diagram showing a topology of a cloud-based deployment based on the configuration specification of the cloud-based deployment.

FIG. 7 is a flow diagram of an example process 700 for deriving a block diagram showing a topology of a cloud-based deployment based on the configuration specification of the cloud-based deployment. The example process 700 can be performed by a cloud-service manager of a cloud-service provider (e.g., the cloud-service provider 104 shown in FIGS. 1 and 4).

In the example process 700, the cloud-service provider identifies, based on the respective class definitions of the one or more classes in a configuration specification, a plurality of data and functional components modeled by the one or more classes and one or more dependency and connectivity relationships existing among the plurality of data or functional components (702). Then, the cloud-service provider derives a block diagram of a cloud-based environment based on the identified plurality of data and functional components and the identified dependency and connectivity relationships (704). In some implementations, when deriving the block diagram, the cloud-service provider also represents trigger events for dynamic reconfiguration of the cloud-based environment in the block diagram.

Figure 8:
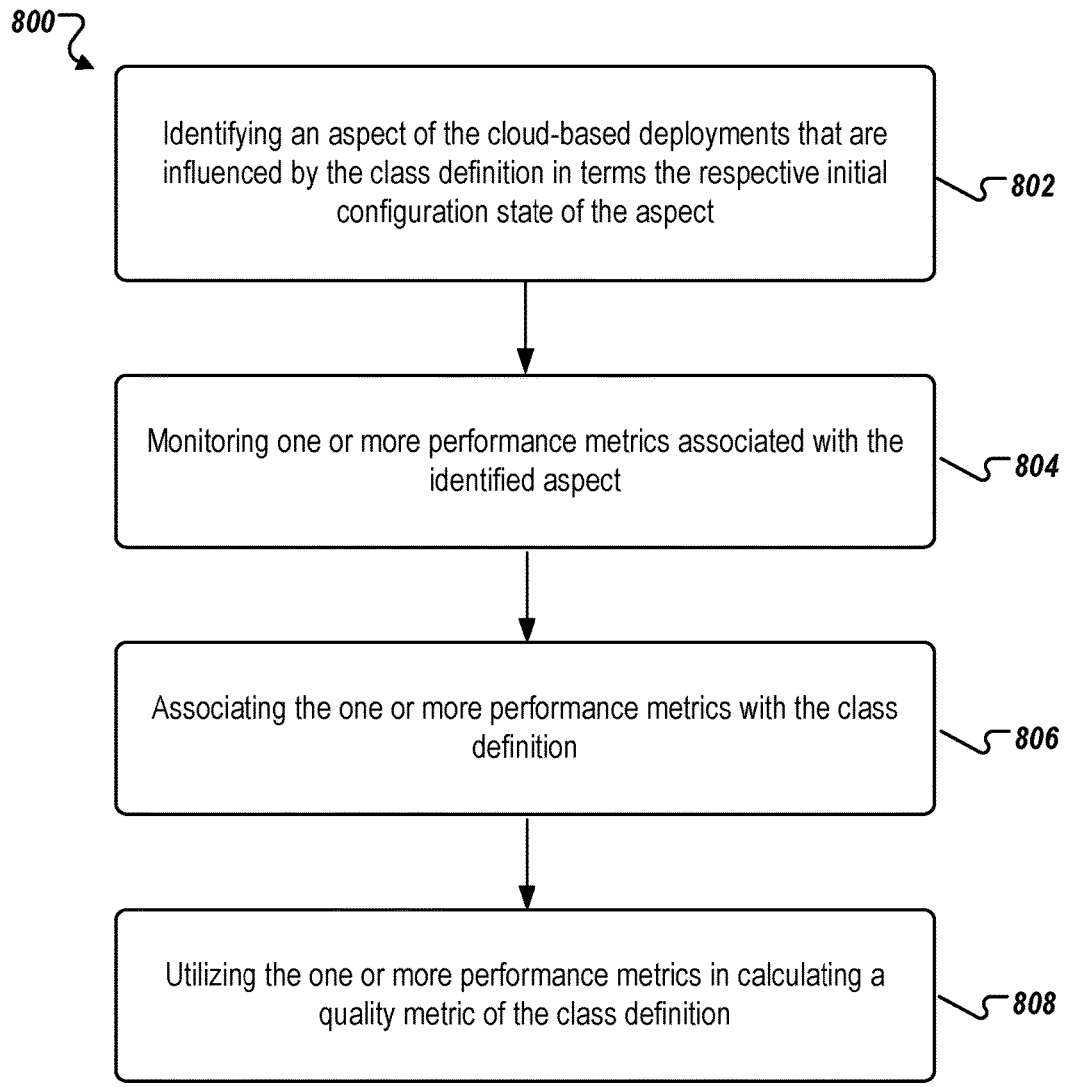
FIG. 8 is a flow diagram of an example process for monitoring performance of cloud-based deployments and associating the performance with class definitions that are used in configuring the cloud-based deployments.

FIG. 8 is a flow diagram of an example process 800 for monitoring performance of cloud-based deployments and associating the performance with class definitions that are used in configuring the cloud-based deployments.

In the example process 800, for each class definition, the cloud-service provider identifies an aspect of the cloud-based deployments that are influenced by the class definition in terms the respective initial configuration state of the aspect (802). The cloud-service provider monitors one or more performance metrics associated with the identified aspect (804). The cloud-service provider associates the one or more performance metrics with the class definition (806). Then, the cloud-service provider utilizes the one or more performance metrics in calculating a quality metric of the class definition (808).

Figure 9:
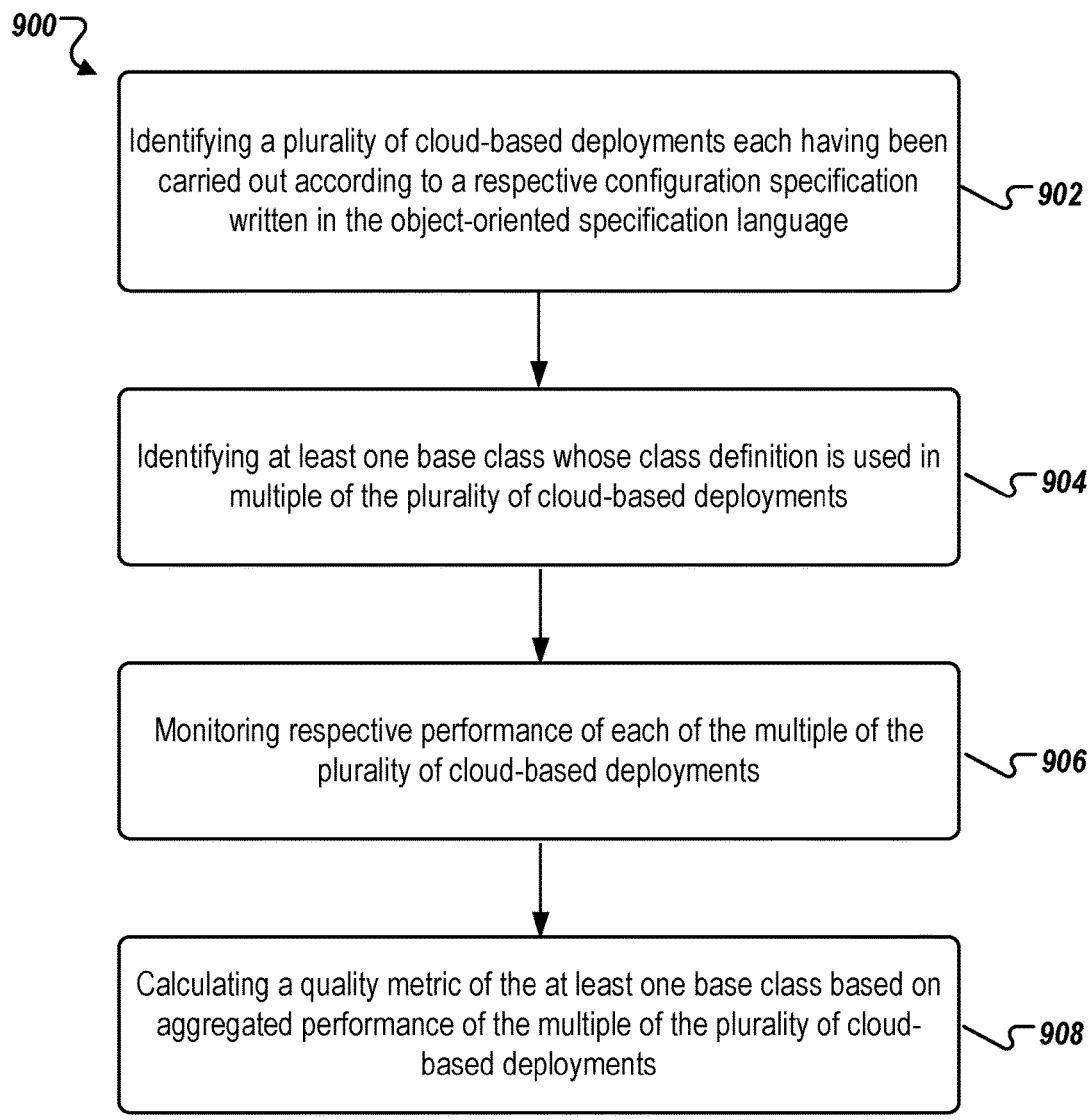
FIG. 9 is a flow diagram of an example process for evaluating the quality of a reused class definition based on aggregated performance of multiple cloud-based deployments that were configured at least in part based on the reused class definition.

FIG. 9 is a flow diagram of an example process 900 for evaluating the quality of a reused class definition based on aggregated performance of multiple cloud-based deployments that were configured at least in part based on the reused class definition.

In the example process 900, the cloud-service provider identifies a plurality of cloud-based deployments each having been carried out according to a respective configuration specification written in the object-oriented specification language (902). The cloud-service provider then identifies at least one base class whose class definition is used in multiple of the plurality of cloud-based deployments (904). The cloud-service provider monitors respective performance of each of the multiple of the plurality of cloud-based deployments (906). The cloud-service provider then calculates a quality metric of the at least one base class based on aggregated performance of the multiple of the plurality of cloud-based deployments (908). In some implementations, the respective performance of each of the multiple of the plurality of cloud-based environment is a performance associated with a data or function component modeled by the at least one class.

Figure 10:
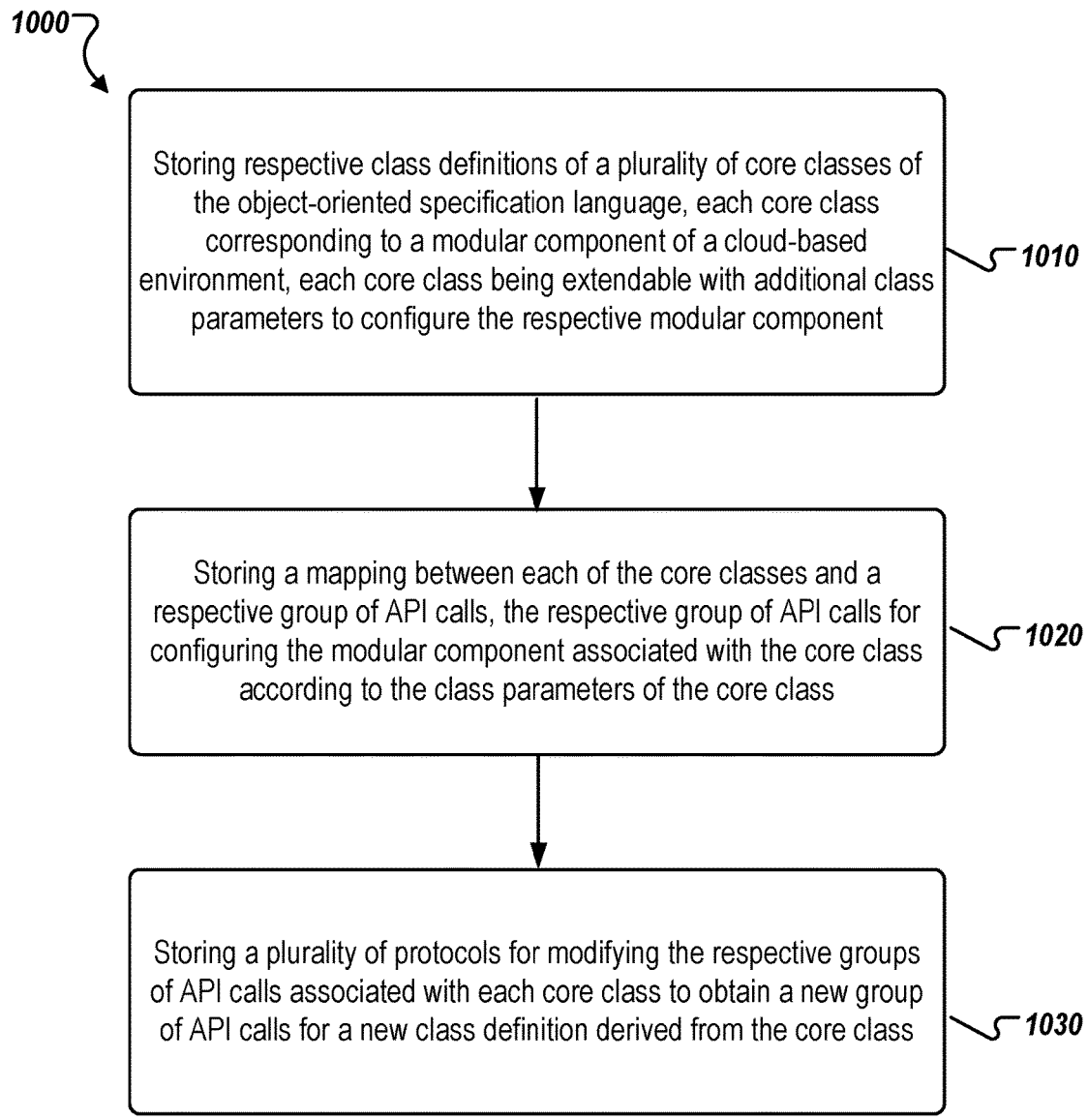
FIG. 10 is a flow diagram of an example process for deriving API calls for configuring a cloud-based deployment based on class definitions used in a configuration specification.

FIG. 10 is a flow diagram of an example process 1000 for deriving API calls for configuring a cloud-based deployment based on class definitions used in a configuration specification.

In the example process 1000, the cloud-service provider stores respective class definitions of a plurality of core classes of the object-oriented specification language (1010). Each core class corresponds to a modular component of a cloud-based environment and each core class is extendable with additional class parameters to configure the respective modular component. The cloud-service provider also stores a mapping between each of the core classes and a respective group of API calls (1020). The respective group of API calls is for configuring the modular component associated with the core class according to the class parameters of the core class. The cloud-service provider also stores a plurality of protocols for modifying the respective groups of API calls associated with each core class to obtain a new group of API calls for a new class definition derived from the core class (1030).

In some implementations, to derive the plurality of API calls for configuring the cloud-based deployment, the cloud-service provider derives the plurality of API calls based on the respective groups of API calls associated with one or more of the plurality of core classes from which the one or more classes of the configuration specification are derived, and based on the plurality of protocols for modifying the respective groups of API calls.

In some implementations, the plurality of protocols further includes rules for imposing an ordering of the groups of API calls according to dependency and connectivity relationships specified in class definitions written according to the object-oriented specification language.

Figure 11:
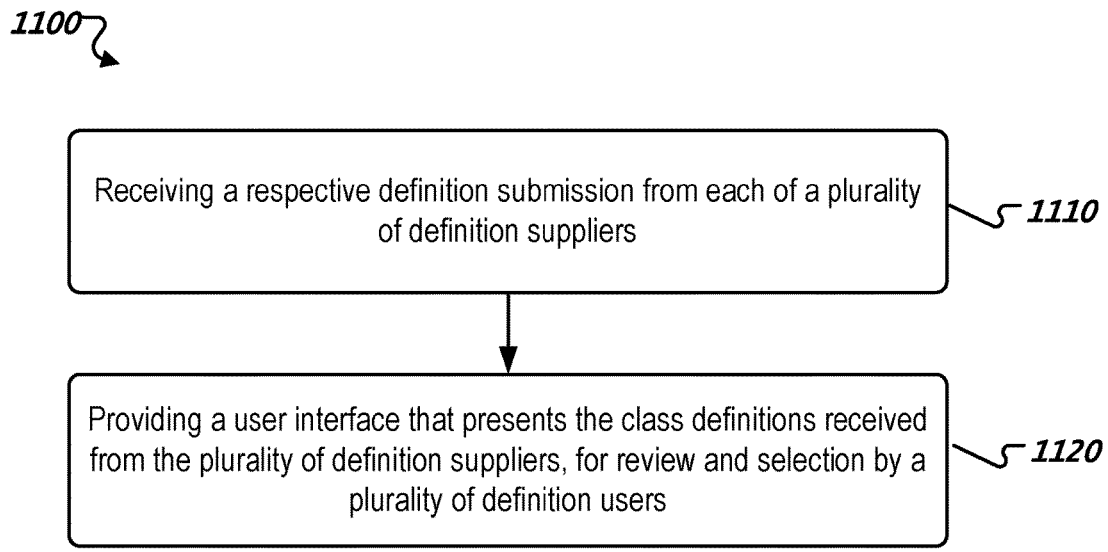
FIG. 11 is a flow diagram of an example process for providing a platform for sharing reusable class definitions.

FIG. 11 is a flow diagram of an example process 1100 for providing a platform for sharing reusable class definitions. The example process 1100 can be performed by a cloud-service provider or a platform provider that does not provider cloud-based services.

In the example process 1100, the cloud-service provider or platform provider receives a respective definition submission from each of a plurality of definition suppliers (1110). The respective definition submission includes one or more class definitions written in an object-oriented specification language. Each class definition models a data or functional component of a cloud-based deployment using a group of configurable class parameters and is extendable to create at least one new class definition by a modification to one or more of the group of configurable class parameters or an addition of one or more new class parameters. The cloud-service provider or platform provider then provides a user interface that presents the class definitions received from the plurality of definition suppliers, for review and selection by a plurality of definition users (1120).

Figure 12:
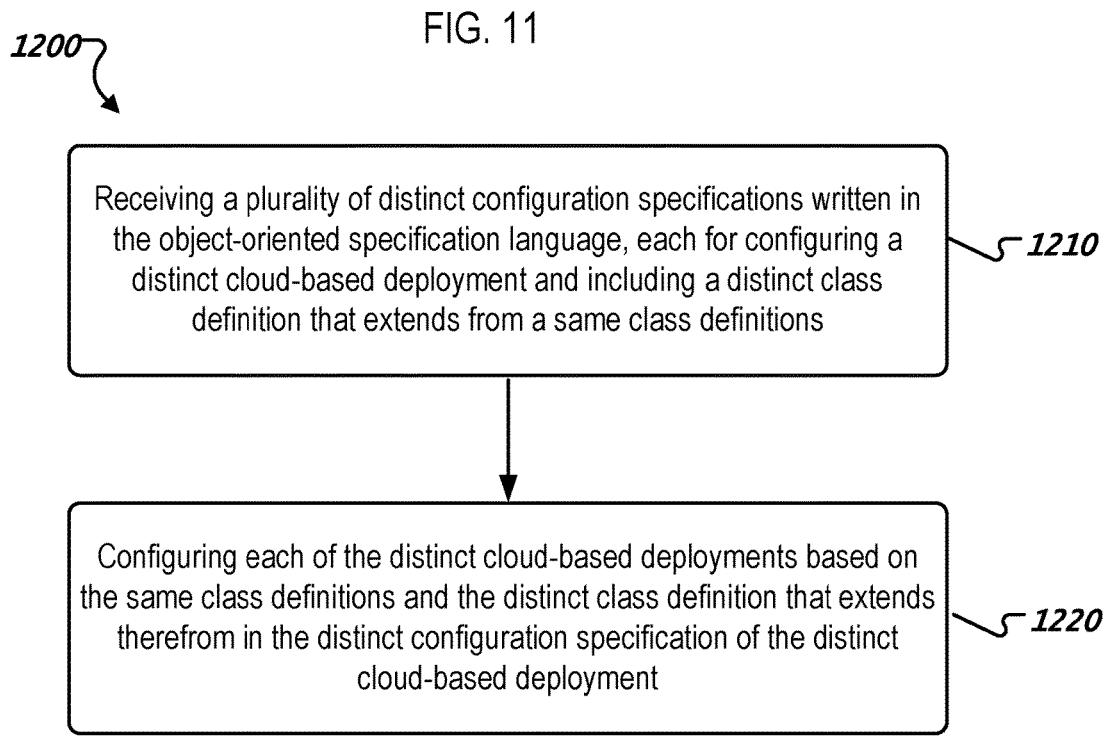
FIG. 12 is a flow diagram of an example process for configuring multiple distinct cloud-based deployments based on distinct configuration specifications that all use at least one common reusable class definition.

FIG. 12 is a flow diagram of an example process 1200 for configuring multiple distinct cloud-based deployments based on distinct configuration specifications that all use at least one common reusable class definition. The example process 1200 can be performed by a cloud-service provider, such as the example cloud-service provider 104 shown in FIG. 4. In the example process 1200, the cloud-service provider receives a plurality of distinct configuration specifications written in the object-oriented specification language (1210). The plurality of distinct configuration specifications are each for configuring a distinct cloud-based deployment and including a distinct class definition that extends from the same one of the class definitions received from the plurality of definition suppliers. Then, the cloud-service provider configures each of the distinct cloud-based deployments based at least on the same one of the received class definitions and the distinct class definition that extends therefrom in the distinct configuration specification of the distinct cloud-based deployment (1220).

Figure 13:
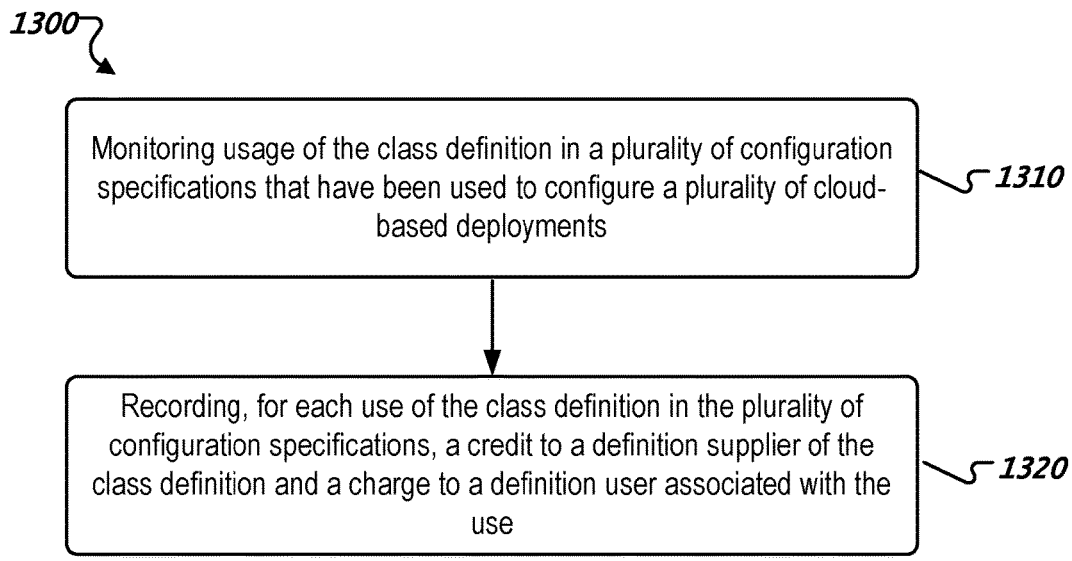
FIG. 13 is a flow diagram of an example process for charging definition users and crediting definition suppliers based on usage of the reusable class definitions provided by the definition suppliers.

FIG. 13 is a flow diagram of an example process 1300 for charging definition users and crediting definition suppliers based on usage of the reusable class definitions provided by the definition suppliers.

In the example process 1300, for each of the received class definitions, the cloud-service provider monitors usage of the class definition in a plurality of configuration specifications that have been used to configure a plurality of cloud-based deployments (1310). The cloud-service provider records, for each use of the class definition in the plurality of configuration specifications, a credit to a definition supplier of the class definition and a charge to a definition user associated with the use (1320).

In some implementations, the usage of the class definition includes an instantiation of the class definition in a respective configuration specification that has been used to carry out a respective cloud-based deployment. In some implementations, the usage of the class definition includes an extension of the class definition to create a new class definition that is instantiated in a respective configuration specification used to carry out a respective cloud-based deployment.

Figure 14:
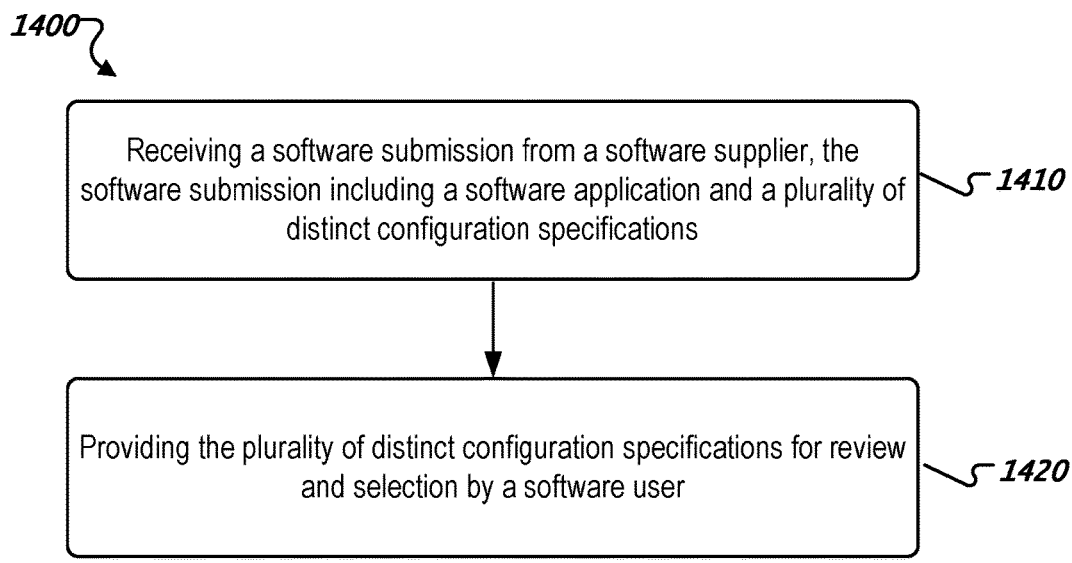
FIG. 14 is a flow diagram of an example process for providing a platform for selling "configuration-wrapped" software solutions.

FIG. 14 is a flow diagram of an example process 1400 for providing a platform for selling "configuration-wrapped" software solutions. The process 1400 can be provided by a cloud-service provider or a platform provider that does not provide cloud-based services.

In the example process 1400, the cloud-service provider or platform provider receives a software submission from a software supplier (1410). The software submission includes a software application to be deployed in a cloud-based environment and a plurality of distinct configuration specifications each for deploying the software application in the cloud-based environment in a distinct manner. Then, the cloud-service provider or platform provider provides the plurality of distinct configuration specifications for review and selection by a software user (1420).

Figure 15:
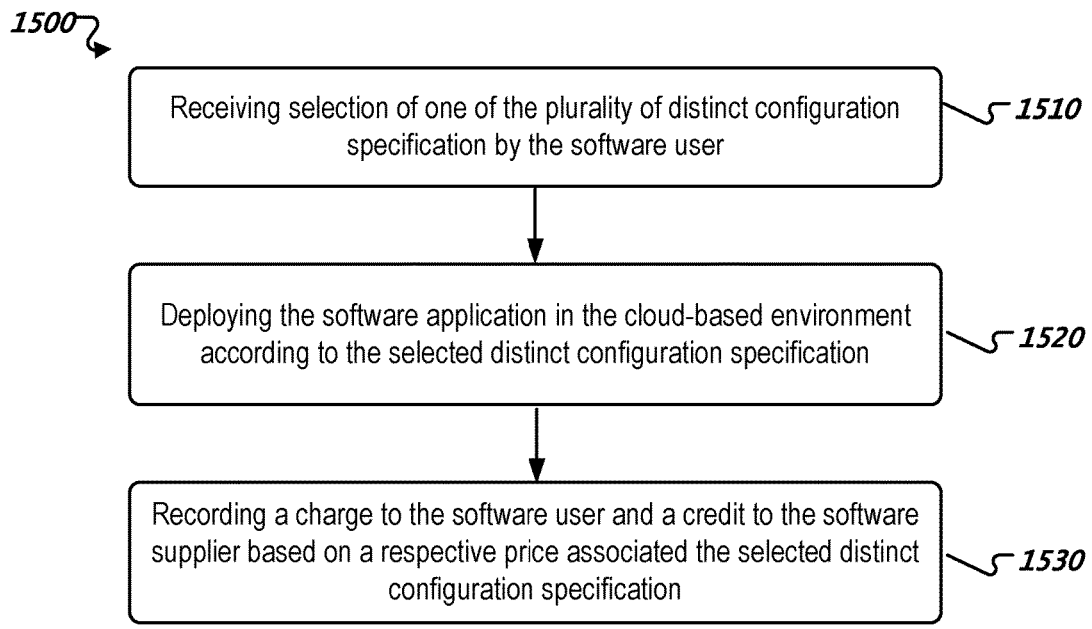
FIG. 15 is a flow diagram of an example process for charging software users and crediting software providers based on the selection of configuration-wrapped software solutions by software users.

FIG. 15 is a flow diagram of an example process 1500 for charging software users and crediting software providers based on the selection of configuration-wrapped software solutions by software users. The example process 1500 can be performed by a cloud-service provider (e.g., the cloud-service provider 104 shown in FIG. 4).

In the example process 1500, the cloud-service provider receives selection of one of the plurality of distinct configuration specification by the software user (1510). The cloud-service provider deploys the software application in the cloud-based environment according to the selected distinct configuration specification (1520). Then, the cloud-service provider records a charge to the software user and a credit to the software supplier based on a respective price associated the selected distinct configuration specification (1530). In some implementations, to provide the plurality of class definitions for selection, the cloud-service provider provides the respective performance metrics with each of the plurality of class definitions for user review in a selection user interface.

Figure 16:
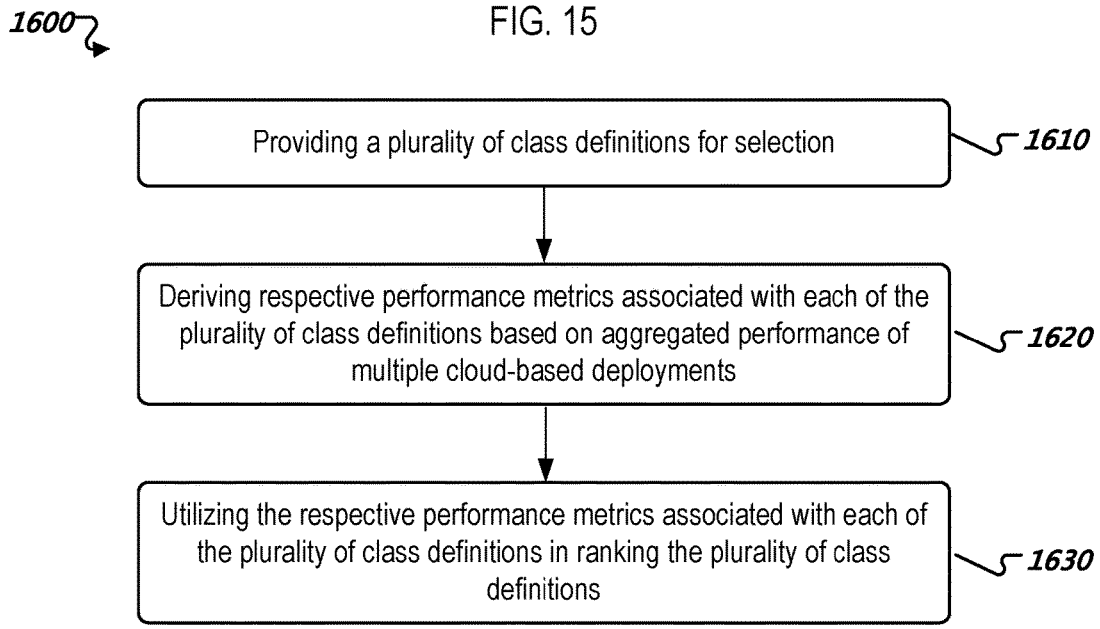
FIG. 16 is a flow diagram of an example process for utilizing aggregated performance metrics of multiple cloud-based deployments in ranking reusable class definitions that have been used in configuring the multiple cloud-based deployments.

FIG. 16 is a flow diagram of an example process 1600 for utilizing aggregated performance metrics of multiple cloud-based deployments in ranking reusable class definitions that have been used in configuring the multiple cloud-based deployments. The example process 1600 can be performed by a cloud-service provider (e.g., a cloud-service provider 104 shown in FIG. 4).

In the example process 1600, the cloud-service provider provides a plurality of class definitions for selection (1610). Each class definition models a respective data or functional component of a cloud-based environment using a group of configurable class parameters. Each class definition supports instantiation and inheritance of the class definition in a configuration specification for a cloud-based deployment. The cloud-service provider also derives respective performance metrics associated with each of the plurality of class definitions based on aggregated performance of multiple cloud-based deployments, where the multiple cloud-based deployments had been carried out according to respective configuration specifications that require instantiation of the class definition or a new class definition derived from the class definition (1620). Then, the cloud-service provider utilizes the respective performance metrics associated with each of the plurality of class definitions in ranking the plurality of class definitions (1630).

Figure 17:
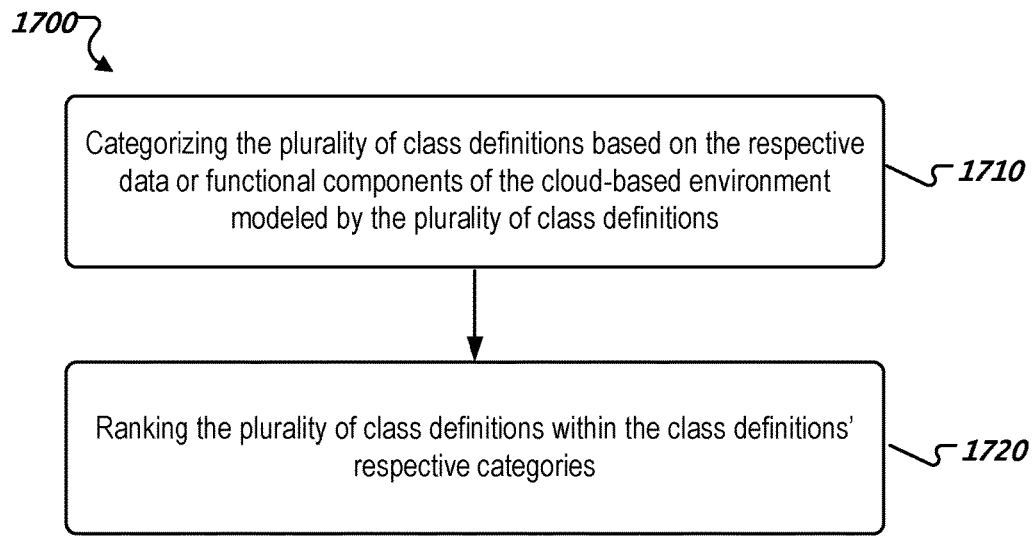
FIG. 17 is a flow diagram of an example process for categorizing reusable class definitions and ranking the reusable class definitions within their respective categories.

FIG. 17 is a flow diagram of an example process 1700 for categorizing reusable class definitions and ranking the reusable class definitions within their respective categories.

In the example process 1700, the cloud-service provider categorizing the plurality of class definitions based on the respective data or functional components of the cloud-based environment modeled by the plurality of class definitions (1710). Then, the cloud-service provider ranks the plurality of class definitions within the class definitions' respective categories (1720).

Figure 18:
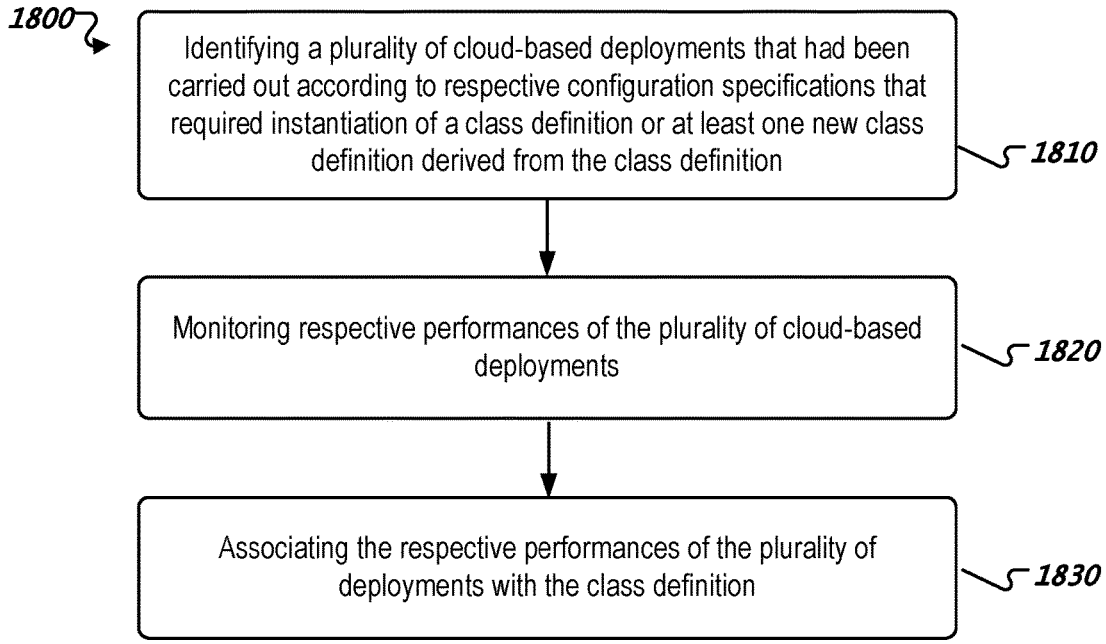
FIG. 18 is a flow diagram of an example process for associating performances of multiple cloud-based deployments with a class definition that was used to configure the multiple cloud-based deployments.

FIG. 18 is a flow diagram of an example process 1800 for associating performances of multiple cloud-based deployments with a class definition that was used to configure the multiple cloud-based deployments.

In the example process 1800, for each of a plurality of class definitions, the cloud-service provider identifies a plurality of cloud-based deployments that had been carried out according to respective configuration specifications that required instantiation of the class definition or at least one new class definition derived from the class definition (1810). The cloud-service provider monitors respective performances of the plurality of cloud-based deployments (1820). The cloud-service provider then associates the respective performances of the plurality of deployments with the class definition (1830).

Figure 19:
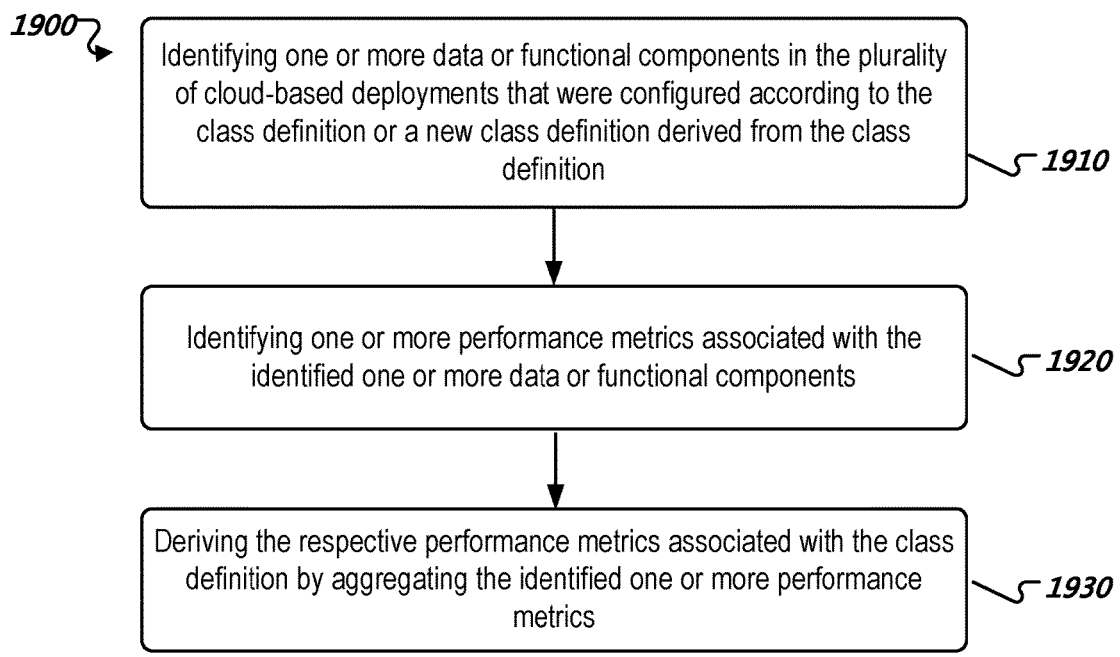
FIG. 19 is a flow diagram of an example process for deriving performance metrics associated with a reused class definition based on aggregated performance of multiple deployments.

FIG. 19 is a flow diagram of an example process 1900 for deriving performance metrics associated with a reused class definition based on aggregated performance of multiple deployments.

When deriving respective performance metrics associated with each of a plurality of class definitions based on aggregated performance of multiple cloud-based deployments, the cloud-service provider performs the example process 1900. In the example process 1900, the cloud-service provider, for each of the plurality of class definitions, identifies one or more data or functional components in the plurality of cloud-based deployments that were configured according to the class definition or a new class definition derived from the class definition (1910). The cloud-service provider identifies one or more performance metrics associated with the identified one or more data or functional components (1920). Then, the cloud-service provider derives the respective performance metrics associated with the class definition by aggregating the identified one or more performance metrics (1930). In some implementations, the performance metrics include one or more measures of latency, reliability, scalability, availability, or security.

Figure 20:
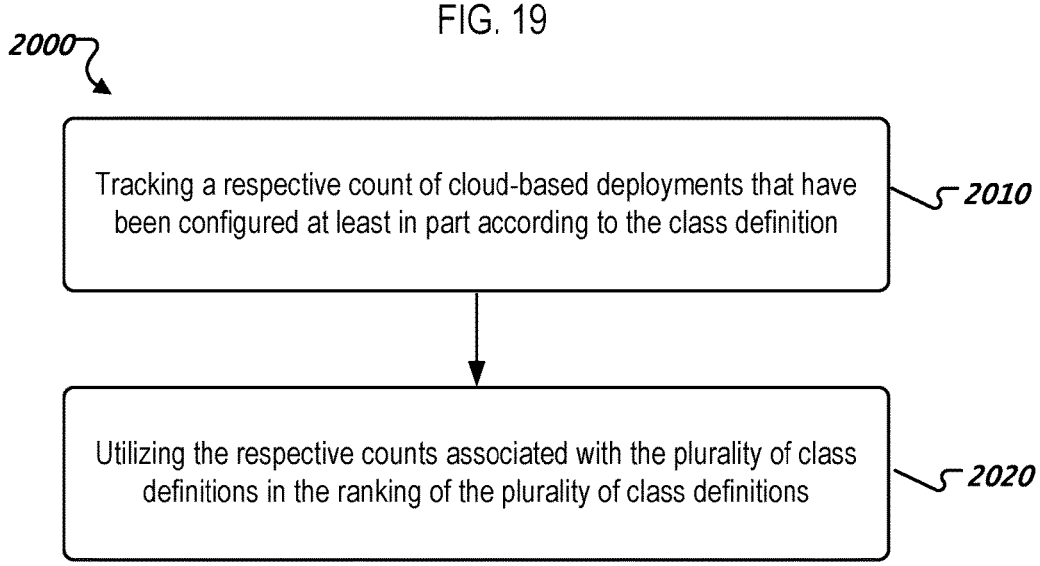
FIG. 20 is a flow diagram of an example process for utilizing multiple factors in ranking reusable class definitions.

FIG. 20 is a flow diagram of an example process 2000 for utilizing multiple factors in ranking reusable class definitions.

In the example process 2000, for each class definition, the cloud-service provider tracks a respective count of cloud-based deployments that have been configured at least in part according to the class definition (2010). Optionally, the cloud-service provider tracks a respective count of problems encountered in cloud-based deployments that have been configured at least in part according to the class definition. Optionally, the cloud-service provider also tracks a number of required changes to resolve the problems encountered in the cloud-based deployments that have been configured at least in part according to the class definition. Then, the cloud-service provider utilizes the respective counts associated with the plurality of class definitions in the ranking of the plurality of class definitions (2020). Optionally, the cloud-service provider also utilizes the respective counts of the problems and the respective numbers of required changes associated with the plurality of class definitions in the ranking of the plurality of class definitions.

In some implementations, the respective numbers of required changes associated with the plurality of class definitions are used to calculate respective weights given to the respective performance metrics associated with the plurality of class definitions in ranking the plurality of class definitions.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices on which are stored instructions that are operable, when executed by the one or more computers, to cause the one or more computers to perform operations comprising:
   receiving, for each of a plurality of services, a corresponding configuration specification that specifies one or more object-oriented classes for instantiation during a cloud-based deployment of a corresponding service, wherein each of the one or more object-oriented classes:
      models a respective data component or a respective functional component required for a cloud-based deployment of the corresponding service; and
      includes definitions for each of one or more configurable class parameters that each represent a requested state of the respective data component or the respective functional component for the cloud-based deployment of the corresponding service;
   deriving, for each of the plurality of configuration specifications, a plurality of application programming interface calls for configuring a cloud-based deployment of the corresponding service using the definitions for each of the configurable class parameters for the one or more object-oriented classes specified by the corresponding configuration specification; and
   causing, for each of the plurality of configuration specifications, execution of each of the plurality of application programming interface calls to configure the cloud-based deployment of the corresponding service.

2. The system of claim 1, wherein deriving, for each of the plurality of configuration specifications, the plurality of application programming interface calls for configuring the cloud-based deployment of the corresponding service using the definitions for each of the configurable class parameters for the one or more object-oriented classes specified by the corresponding configuration specification comprises:
   for a first configuration specification in the plurality of configuration specifications:
      determining that the first configuration specification, for a first service from the plurality of services, specifies a first definition for a first configurable class parameter for a particular object-oriented class; and
      deriving a first application programming interface call for the first service using the first definition for the first configurable class parameter for the particular object-oriented class; and
   for a second configuration specification in the plurality of configuration specifications that is a different configuration specification from the first configuration specification:
      determining that the second configuration specification, for a second service from the plurality of services that is a different service than the first service, specifies a second definition for a second configurable class parameter for the particular object-oriented class, wherein the second configurable class parameter is a different parameter or has a different definition than the first configurable class parameter; and
      deriving a second application programming interface call for the second service using the second definition for the second configurable class parameter for the particular object-oriented class, wherein the second application programming interface call is a different application programming interface call than the first application programming interface call.

3. The system of claim 1, wherein deriving, for each of the plurality of configuration specifications, the plurality of application programming interface calls for configuring the cloud-based deployment of the corresponding service using the definitions for each of the configurable class parameters for the one or more object-oriented classes specified by the corresponding configuration specification comprises, for each of the plurality of configuration specifications:
   identifying one or more base object-oriented classes from which at least one of the one or more object-oriented classes is derived;
   extracting base class parameters for the one or more base object-oriented classes;
   determining a subset of the base class parameters that are not modified by the configurable class parameters for the one or more object-oriented classes; and
   deriving the plurality of application programming interface calls for configuring the cloud-based deployment of the corresponding service using the definitions for each of the configurable class parameters and base definitions for each of the base class parameters in the subset of the base class parameters that are not modified.

4. The system of claim 1, the operations comprising:
   for each of the one or more object-oriented classes:
      identifying a plurality of cloud-based deployments that had been carried out according to respective configuration specifications that required instantiation of the respective object-oriented class or a new object-oriented class derived from the respective object-oriented class;
      monitoring respective performances of each of the plurality of cloud-based deployments; and
      associating, with the respective object-oriented class, the respective performances of each of the plurality of cloud-based deployments that had been carried out according to respective configuration specifications that required instantiation of the respective object-oriented class or a new object-oriented class derived from the respective object-oriented class.

5. The system of claim 4, the operations comprising:
   for each of the one or more object-oriented classes:
      identifying one or more data components or one or more functional components in the plurality of cloud-based deployments that were configured according to the respective object-oriented class or a new object-oriented class derived from the respective object-oriented class;
      identifying one or more performance metrics associated with the identified one or more data components or one or more functional components; and
      aggregating the identified one or more performance metrics for the respective object-oriented class, wherein associating the respective performances of each of the plurality of cloud-based deployments with the respective object-oriented class comprises associating the aggregated performance metrics with the respective object-oriented class.

6. The system of claim 4, the operations comprising:
   modifying, for a particular object-oriented class from the one or more object-oriented classes, a default value for one of the configurable class parameters using the respective performances of each of the plurality of cloud-based deployments that had been carried out according to respective configuration specifications that required instantiation of the particular object-oriented class or a new object-oriented class derived from the particular object-oriented class.

7. The system of claim 6, the operations comprising:
deriving, for the particular object-oriented class, a plurality of application programming interface calls for configuring a cloud-based deployment of a service using the modified default value for the one of the configurable class parameters; and
causing execution of each of the plurality of application programming interface calls to configure the cloud-based deployment of the service.

8. A computer-implemented method comprising:
receiving, for each of a plurality of services, a corresponding configuration specification that specifies one or more object-oriented classes for instantiation during a cloud-based deployment of a corresponding service, wherein each of the one or more object-oriented classes:
    models a respective data component or a respective functional component required for a cloud-based deployment of the corresponding service; and
    includes definitions for each of one or more configurable class parameters that each represent a requested state of the respective data component or the respective functional component for the cloud-based deployment of the corresponding service;
deriving, for each of the plurality of configuration specifications, a plurality of application programming interface calls for configuring a cloud-based deployment of the corresponding service using the definitions for each of the configurable class parameters for the one or more object-oriented classes specified by the corresponding configuration specification; and
causing, for each of the plurality of configuration specifications, execution of each of the plurality of application programming interface calls to configure the cloud-based deployment of the corresponding service.

9. The method of claim 8, wherein deriving, for each of the plurality of configuration specifications, the plurality of application programming interface calls for configuring the cloud-based deployment of the corresponding service using the definitions for each of the configurable class parameters for the one or more object-oriented classes specified by the corresponding configuration specification comprises:
    for a first configuration specification in the plurality of configuration specifications:
        determining that the first configuration specification, for a first service from the plurality of services, specifies a first definition for a first configurable class parameter for a particular object-oriented class; and
        deriving a first application programming interface call for the first service using the first definition for the first configurable class parameter for the particular object-oriented class; and
    for a second configuration specification in the plurality of configuration specifications that is a different configuration specification from the first configuration specification:
        determining that the second configuration specification, for a second service from the plurality of services that is a different service than the first service, specifies a second definition for a second configurable class parameter for the particular object-oriented class, wherein the second configurable class parameter is a different parameter or has a different definition than the first configurable class parameter; and
        deriving a second application programming interface call for the second service using the second definition for the second configurable class parameter for the particular object-oriented class, wherein the second application programming interface call is a different application programming interface call than the first application programming interface call.

10. The method of claim 8, wherein deriving, for each of the plurality of configuration specifications, the plurality of application programming interface calls for configuring the cloud-based deployment of the corresponding service using the definitions for each of the configurable class parameters for the one or more object-oriented classes specified by the corresponding configuration specification comprises, for each of the plurality of configuration specifications:
    identifying one or more base object-oriented classes from which at least one of the one or more object-oriented classes is derived;
    extracting base class parameters for the one or more base object-oriented classes;
    determining a subset of the base class parameters that are not modified by the configurable class parameters for the one or more object-oriented classes; and
    deriving the plurality of application programming interface calls for configuring the cloud-based deployment of the corresponding service using the definitions for each of the configurable class parameters and base definitions for each of the base class parameters in the subset of the base class parameters that are not modified.

11. The method of claim 8, comprising:
for each of the one or more object-oriented classes:
    identifying a plurality of cloud-based deployments that had been carried out according to respective configuration specifications that required instantiation of the respective object-oriented class or a new object-oriented class derived from the respective object-oriented class;
    monitoring respective performances of each of the plurality of cloud-based deployments; and
    associating, with the respective object-oriented class, the respective performances of each of the plurality of cloud-based deployments that had been carried out according to respective configuration specifications that required instantiation of the respective object-oriented class or a new object-oriented class derived from the respective object-oriented class.

12. The method of claim 11, comprising:
for each of the one or more object-oriented classes:
    identifying one or more data components or one or more functional components in the plurality of cloud-based deployments that were configured according to the respective object-oriented class or a new object-oriented class derived from the respective object-oriented class;
    identifying one or more performance metrics associated with the identified one or more data components or one or more functional components; and
    aggregating the identified one or more performance metrics for the respective object-oriented class, wherein associating the respective performances of each of the plurality of cloud-based deployments with the respective object-oriented class comprises associating the aggregated performance metrics with the respective object-oriented class.

13. The method of claim 11, comprising:

modifying, for a particular object-oriented class from the one or more object-oriented classes, a default value for one of the configurable class parameters using the respective performances of each of the plurality of cloud-based deployments that had been carried out according to respective configuration specifications that required instantiation of the particular object-oriented class or a new object-oriented class derived from the particular object-oriented class.

14. The method of claim 13, comprising:

deriving, for the particular object-oriented class, a plurality of application programming interface calls for configuring a cloud-based deployment of a service using the modified default value for the one of the configurable class parameters; and causing execution of each of the plurality of application programming interface calls to configure the cloud-based deployment of the service.

15. A non-transitory computer storage medium encoded with instructions that, when executed by one or more computers, cause the one or more computers to perform operations comprising:

receiving, for each of a plurality of services, a corresponding configuration specification that specifies one or more object-oriented classes for instantiation during a cloud-based deployment of a corresponding service, wherein each of the one or more object-oriented classes:

models a respective data component or a respective functional component required for a cloud-based deployment of the corresponding service; and includes definitions for each of one or more configurable class parameters that each represent a requested state of the respective data component or the respective functional component for the cloud-based deployment of the corresponding service;

deriving, for each of the plurality of configuration specifications, a plurality of application programming interface calls for configuring a cloud-based deployment of the corresponding service using the definitions for each of the configurable class parameters for the one or more object-oriented classes specified by the corresponding configuration specification; and causing, for each of the plurality of configuration specifications, execution of each of the plurality of application programming interface calls to configure the cloud-based deployment of the corresponding service.

16. The computer storage medium of claim 15, wherein deriving, for each of the plurality of configuration specifications, the plurality of application programming interface calls for configuring the cloud-based deployment of the corresponding service using the definitions for each of the configurable class parameters for the one or more object-oriented classes specified by the corresponding configuration specification comprises:

for a first configuration specification in the plurality of configuration specifications:

determining that the first configuration specification, for a first service from the plurality of services, specifies a first definition for a first configurable class parameter for a particular object-oriented class; and deriving a first application programming interface call for the first service using the first definition for the first configurable class parameter for the particular object-oriented class; and for a second configuration specification in the plurality of configuration specifications that is a different configuration specification from the first configuration specification:

determining that the second configuration specification, for a second service from the plurality of services that is a different service than the first service, specifies a second definition for a second configurable class parameter for the particular object-oriented class, wherein the second configurable class parameter is a different parameter or has a different definition than the first configurable class parameter; and deriving a second application programming interface call for the second service using the second definition for the second configurable class parameter for the particular object-oriented class, wherein the second application programming interface call is a different application programming interface call than the first application programming interface call.

17. The computer storage medium of claim 15, wherein deriving, for each of the plurality of configuration specifications, the plurality of application programming interface calls for configuring the cloud-based deployment of the corresponding service using the definitions for each of the configurable class parameters for the one or more object-oriented classes specified by the corresponding configuration specification comprises, for each of the plurality of configuration specifications:

identifying one or more base object-oriented classes from which at least one of the one or more object-oriented classes is derived;

extracting base class parameters for the one or more base object-oriented classes;

determining a subset of the base class parameters that are not modified by the configurable class parameters for the one or more object-oriented classes; and deriving the plurality of application programming interface calls for configuring the cloud-based deployment of the corresponding service using the definitions for each of the configurable class parameters and base definitions for each of the base class parameters in the subset of the base class parameters that are not modified.

18. The computer storage medium of claim 15, the operations comprising:

for each of the one or more object-oriented classes:

identifying a plurality of cloud-based deployments that had been carried out according to respective configuration specifications that required instantiation of the respective object-oriented class or a new object-oriented class derived from the respective object-oriented class;

monitoring respective performances of each of the plurality of cloud-based deployments; and associating, with the respective object-oriented class, the respective performances of each of the plurality of cloud-based deployments that had been carried out according to respective configuration specifications that required instantiation of the respective object-oriented class or a new object-oriented class derived from the respective object-oriented class.

19. The computer storage medium of claim 18, the operations comprising:
for each of the one or more object-oriented classes:
identifying one or more data components or one or more functional components in the plurality of cloud-based deployments that were configured according to the respective object-oriented class or a new object-oriented class derived from the respective object-oriented class;
identifying one or more performance metrics associated with the identified one or more data components or one or more functional components; and
aggregating the identified one or more performance metrics for the respective object-oriented class, wherein associating the respective performances of each of the plurality of cloud-based deployments with the respective object-oriented class comprises associating the aggregated performance metrics with the respective object-oriented class.

20. The computer storage medium of claim 18, the operations comprising:
modifying, for a particular object-oriented class from the one or more object-oriented classes, a default value for one of the configurable class parameters using the respective performances of each of the plurality of cloud-based deployments that had been carried out according to respective configuration specifications that required instantiation of the particular object-oriented class or a new object-oriented class derived from the particular object-oriented class.

21. The system of claim 1, wherein deriving, for each of the plurality of configuration specifications, a plurality of application programming interface calls for configuring a cloud-based deployment of the corresponding service using the definitions for each of the configurable class parameters for the one or more object-oriented classes specified by the corresponding configuration specification comprises:
for each of the plurality of configuration specifications:
retrieving, for each of the one or more object-oriented classes from a database using the configuration specification, a corresponding base class definition; and
deriving the plurality of application programming interface calls for configuration the cloud-based deployment of the corresponding service using a) the corresponding base class definition for each of the one or more object-oriented classes, and b) the definitions for each of the configurable class parameters for the one or more object-oriented classes specified by the corresponding configuration specification.

* * * * *